(12) United States Patent  (10) Patent No.: US 9,779,435 B2
Crutcher et al.  (45) Date of Patent: Oct. 3, 2017

(54) SYSTEMS, METHODS, AND COMPUTER PROGRAM PRODUCTS FOR MOBILE PROCESSING OF PACKAGE SHIPMENT ORDERS AT A POINT OF SALE

(75) Inventors: Byron Crutcher, Spring Branch, TX (US); Lester Ross, Owasso, OK (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 245 days.

(21) Appl. No.: 13/348,016

(22) Filed: Jan. 11, 2012

(65) Prior Publication Data

US 2013/0179299 A1  Jul. 11, 2013

(51) Int. Cl.
G06Q 30/00 (2012.01)
G06Q 30/06 (2012.01)
G06Q 10/08 (2012.01)

(52) U.S. Cl.
CPC ........... *G06Q 30/06* (2013.01); *G06Q 10/083* (2013.01)

(58) Field of Classification Search
CPC ............ G01C 21/3679; G06Q 10/083; G06Q 10/08345; G06Q 30/0601; G06Q 30/0633
USPC ............................................... 705/26.1, 27.1
See application file for complete search history.

(56) References Cited

U.S. PATENT DOCUMENTS

| | | | |
|---|---|---|---|
| 4,005,400 A | 1/1977 | Engdahl | |
| 4,588,881 A | 5/1986 | Pejas et al. | |
| 4,628,193 A | 12/1986 | Blum | |
| 4,634,845 A | 1/1987 | Hale et al. | |
| 4,635,247 A | 1/1987 | Tejima | |
| 4,651,150 A | 3/1987 | Katz et al. | |
| 4,711,994 A | 12/1987 | Greenberg | |
| 4,718,103 A | 1/1988 | Shjima et al. | |
| 4,752,965 A | 6/1988 | Dunkley | |

(Continued)

FOREIGN PATENT DOCUMENTS

| | | |
|---|---|---|
| EP | 0369188 | 5/1990 |
| EP | 0565290 | 10/1993 |

(Continued)

OTHER PUBLICATIONS

Anonymous, "FedEx Refreshes Web Tracking Tools," Business Wire, Jan. 29, 2009.*

(Continued)

*Primary Examiner* — Brandy A Zukanovich
(74) *Attorney, Agent, or Firm* — Alston & Bird LLP

(57) ABSTRACT

Various embodiments provide computer program products and mobile purchase shipping systems for facilitating purchase of a product by a customer. The products and systems may be configured to receive customer data associated with the customer and to validate at least a portion of the received customer data. The products and systems may then receive package data associated with the product and receive payment data from a type of payment presented by the customer. Once received, the products and systems may use at least a portion of the validated data, the package data, and the payment data to generate a shipping manifest. In certain embodiments, the products and systems may include a magnetic card reader configured to read customer data from a customer driver's license. Still other embodiments may incorporate a mobile printer, such that the products and systems may generate a package shipping label, a shipping manifest, and/or a receipt.

17 Claims, 19 Drawing Sheets

(56) References Cited

U.S. PATENT DOCUMENTS

| | | | |
|---|---|---|---|
| 4,783,740 | A | 11/1988 | Ishizawa et al. |
| 4,832,204 | A | 5/1989 | Handy et al. |
| 4,857,713 | A | 8/1989 | Brown |
| 4,866,646 | A | 9/1989 | Nakamura et al. |
| 4,899,137 | A | 2/1990 | Behrens et al. |
| 4,927,986 | A | 5/1990 | Daly |
| 5,031,098 | A | 7/1991 | Miller et al. |
| 5,031,223 | A | 7/1991 | Rosenbaum et al. |
| 5,038,283 | A | 8/1991 | Caveney |
| 5,043,908 | A | 8/1991 | Manduley et al. |
| 5,049,862 | A | 9/1991 | Dao et al. |
| 5,068,787 | A | 11/1991 | Pipella et al. |
| 5,068,797 | A | 11/1991 | Sansone et al. |
| 5,072,400 | A | 12/1991 | Manduley |
| 6,285,916 | B1 | 9/2001 | Kadaba et al. |
| 8,086,344 | B1* | 12/2011 | Mishra ............... G06Q 10/087 700/214 |
| 2002/0196944 | A1 | 12/2002 | Davis et al. |
| 2003/0004812 | A1 | 1/2003 | Kasasaku |
| 2003/0217018 | A1 | 11/2003 | Groff et al. |
| 2005/0080693 | A1 | 4/2005 | Foss et al. |
| 2005/0267821 | A1 | 12/2005 | Anderson |
| 2006/0080133 | A1 | 4/2006 | Das et al. |
| 2006/0237533 | A1 | 10/2006 | Stelzer |
| 2007/0219905 | A1 | 9/2007 | Gohmann et al. |
| 2008/0004967 | A1* | 1/2008 | Gillen ............................. 705/24 |
| 2010/0057612 | A1 | 3/2010 | Wagenhals |
| 2010/0082444 | A1 | 4/2010 | Lin et al. |
| 2011/0145107 | A1 | 6/2011 | Greco |

FOREIGN PATENT DOCUMENTS

| | | |
|---|---|---|
| EP | 0573018 | 12/1993 |
| EP | 2045767 A1 | 4/2009 |
| FR | 2 559 929 | 8/1985 |
| FR | 2 676 846 | 11/1992 |
| FR | 2 689 275 | 10/1993 |
| GB | 2 038 524 | 7/1980 |
| JP | 63-312749 | 12/1988 |
| JP | 4365155 | 12/1992 |
| WO | WO 8904016 | 5/1989 |
| WO | WO 9402908 | 2/1994 |

OTHER PUBLICATIONS

International Searching Authority, International Search Report for International Application No. PCT/US2012/047368, mailed Jan. 9, 2013, 9 pages, United States Patent and Trademark Office, USA.
International Preliminary Examining Authority, International Preliminary Preliminary Report on Patentability for International Application No. PCT/US2012/047368, mailed Feb. 14, 2014, 24 pages, United States Patent and Trademark Office, USA.
European Patent Office, Extended European Search Report for Application No. 12740836.7, Jul. 16, 2015, 7 pages, Germany.
Canadian Intellectual Propoerty Office, Requisition by the Examiner for Application No. 2,852,412, Aug. 5, 2016, 4 pages, Canada.
European Patent Office, Communication pursuant to Article 94(3) EPC for Application No. 12740836.7, May 30, 2016, 8 pages, Germany.
State Intellectual Property Office of the P.R.C., First Office Action for Application No. 201280066598.3, Mar. 6, 2017, 29 pages, China.

* cited by examiner

SYSTEMS, METHODS, AND COMPUTER PROGRAM PRODUCTS FOR MOBILE PROCESSING OF PACKAGE SHIPMENT ORDERS AT A POINT OF SALE

BACKGROUND

Many retail sales providers that offer a variety of retail articles for sale are located in and operated within larger retail facilities. Such retail sales providers are often event or special occasion (e.g., game day) driven, in which case, customer volumes may be extremely high. In such instances, it is often desirable to facilitate customer processing of desired purchases for not only provider efficiency, but also customer convenience. In the past, customers must locate an item for purchase and subsequently wait in, often quite long, lines to purchase the same. As such, a need exists for an improved device that facilitates seamless and efficient completion of such transactions, without the need for traditional cashiers and their associated lines.

Further, because such retail sales providers as described above are often event or special occasion driven, it is often preferable to offer consolidated sales purchase and shipping services to customers. Indeed, customers who are attending events such as football games, concerts, and the like, typically do not want to lug purchased items around at their attended event or occasion. In the past, customers have either had to postpone purchases until the end of the night further exacerbating the problems highlighted above, or had to carry their purchases around. As such, a need exists for a mobile device that not only processes purchase orders, but also electronically collects the customer data necessary for not only purchasing but also shipping a customer's items.

BRIEF SUMMARY

Various embodiments of the present invention address the above needs and achieves other advantages by providing a mobile purchase and shipping system for facilitating a purchase of a product by a customer. The system according to these and other embodiments may comprise one or more memory storage areas and one or more computer processors that are configured to receive data stored in the one or more memory storage areas. The one or more computer processors may be further configured to: receive customer data associated with the customer; validate at least a portion of the received customer data; receive package data associated with the product; receive payment data from a type of payment presented by the customer; and use at least a portion of the validated data, the package data, and the payment data to generate a shipping manifest.

Still further embodiments of the present invention provide a mobile purchase and shipping system for facilitating a purchase of a product by a customer. Such systems comprise one or more memory storage areas and one or more computer processors that are configured to receive data stored in the one or more memory storage areas. The one or more computer processors may be further configured to: receive customer data; validate at least a portion of the received customer data; and use at least a portion of the validated data to facilitate generation of a shipping manifest.

Various embodiments of the present invention provide a computer program product comprising at least one computer-readable storage medium having computer-readable program code portions embodied therein. The computer-readable program code portions may comprise: a first executable portion configured for receiving customer data; a second executable portion configured for validating at least a portion of the received customer data; a third executable portion configured for receiving package data associated with a product; a fourth executable portion configured for receiving payment data; and a fifth executable portion configured for using at least a portion of the validated data, the package data, and the payment data to generate a shipping label manifest.

BRIEF DESCRIPTION OF THE SEVERAL VIEWS OF THE DRAWING(S)

Having thus described various embodiments of the invention in general terms, reference will now be made to the accompanying drawings, which are not necessarily drawn to scale, and wherein:

DETAILED DESCRIPTION OF VARIOUS EMBODIMENTS

Figure 1:
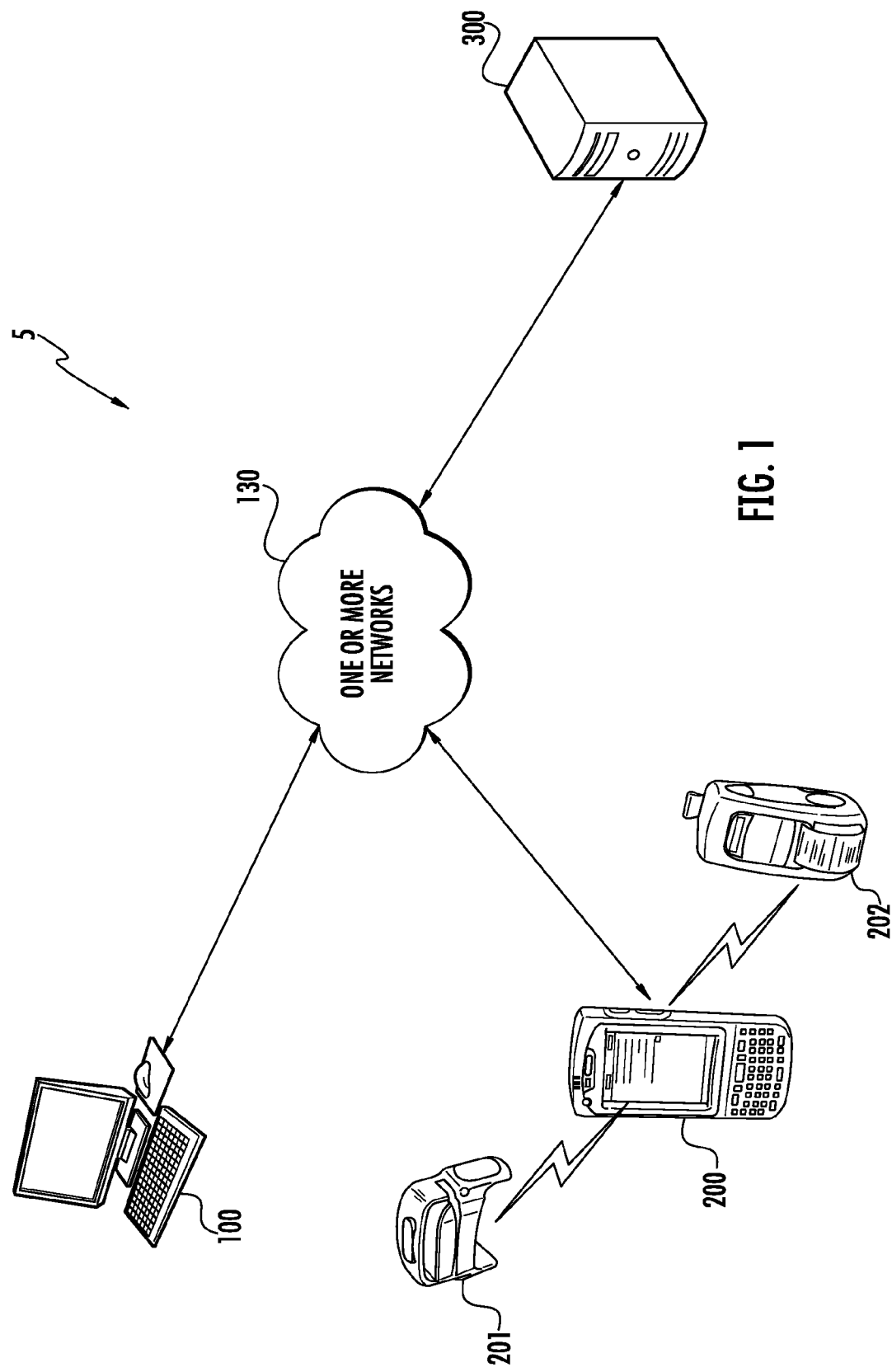
FIG. 1 is a schematic diagram of an exemplary mobile shipping system according to various embodiments.

Various embodiments of the present invention now will be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. Like numbers refer to like elements throughout.

Systems, Apparatuses, Methods, and Computer Program Products

As should be appreciated, various embodiments may be implemented in various ways, including as systems, apparatuses, methods, or computer program products. Accordingly, the embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

General Overview

In general, according to various embodiments of the present invention, systems, apparatuses, methods, and computer program products are provided for coordinating the onsite processing of package purchase and shipment orders placed at remote points of sale. This may include capturing, storing, and analyzing content data associated with such orders, including the non-limiting examples of customer data, address validation data, package data, payment data, and print data. To provide improved efficiency of scale, in various embodiments, at least a portion of the customer data may be scanned from, for example, a customer's driver's license. In certain embodiments, the driver's license data may be scanned via a magnetic card reader. In other embodiments, such may be scanned via a two-dimensional (2-D) imager, while in still other envisioned embodiments such data may be read with a barcode scanner or any of a variety of devices, as may be configured to acquire data from one or more of the variously formatted driver's licenses. As will be described in further detail below, at least certain embodiments may provide a stylus and/or touchpad screen for alternative data entry capabilities. In particular embodiments, the customer data may include any of a variety of combinations of a customer name, a customer address, a customer email, a customer phone number, and, if different from above, certain recipient data.

To provide further efficiency and customer convenience, in various embodiments, an address validation tool may be accessed to minimize inaccuracies encountered in data scanned from driver's licenses or otherwise acquired. In certain embodiments, the address validation tool returns one or more updated addresses, as validated against one or more standardization tools, as commonly known and used in the art, as disclosed in at least U.S. Patent Application Publication No. 2005/0267821 owned by the United Parcel Service of America, Inc. and incorporated herein by reference in its entirety.

Upon selection of a validated and/or standardized address, various embodiments may prompt a user to, if desired, further enter package and/or payment data. In certain embodiments, such may be acquired manually, while in other embodiments, such may be scanned as previously described with regard to the customer data. In particular embodiments, the package data may include any of a variety of combinations of a package weight, package dimensions, a service code, a service cost, and a reference number (e.g., a tracking and/or routing code). The payment data may include any of a variety of combinations of a payment type, a card number, and an authorized signature.

Upon receipt of certain combinations of the above customer, package, and/or payment data, particular embodiments are configured to prompt user printing of various combinations of a shipping label, a "pick" ticket for subsequent payment, and/or a receipt. It should be understood that this process can be performed at a variety of remote locations and during a variety of timeframes, although generally prior to shipping a package to which the shipping label is affixed so as to (a) provide increased efficiency of customer service and (b) enable fully mobile processing of all stages of a purchase and shipping transaction.

Exemplary System Architecture

FIG. 1 provides an illustration of one type of an onsite shipping system 5 that can be used in conjunction with various embodiments of the present invention. In the illustrated embodiment, the system 5 may include one or more networks 130, a mobile device 200, a data acquisition device 201, a printing device 202, a central server 300, and a remote terminal 100. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although at least the mobile device 200, the central server 300, and the remote terminal 100 are illustrated in FIG. 1 as communicating with one another over the same one or more networks 130, these devices may likewise communicate over multiple, separate networks. For example, while the mobile device 200 may communicate with the central server 300 over a wireless personal area network (WPAN) using, for example, Bluetooth techniques, the remote terminal 100 may communicate with the central server 300 over a wireless wide area network (WWAN), for example, in accordance with EDGE, or some other 2.5G wireless communication protocol.

According to one embodiment, in addition to receiving data from the remote terminal 100 and/or the central server 300, the mobile device 200 may be further configured to collect and transmit data on its own. For example, according to one embodiment, the mobile device 200 may include a data acquisition device 201 such as the non-limiting example of a magnetic card reader configured to acquire certain customer data in the form of driver's license data. In particular embodiments, and as is described in more detail below, the data acquisition device 201 may be further used to gather information regarding a package or purchased item, or even a method of payment, which may, in turn, be used to facilitate further mobile processing of a purchase and shipment transaction.

The mobile device 200 may be any device associated with a carrier (e.g., a common carrier, such as UPS, FedEx, USPS, etc.). In various embodiments, the data mobile device 200 may be capable of receiving and/or sending data via one or more input units or devices, such as a keypad, a touchpad, a magnetic card reader 201, a barcode scanner, a radio frequency identification (RFID) reader, an interface card (e.g., modem, etc.), a printing device 202, and/or a receiver. The mobile device 200 may be configured to communicate with any combination of these input units or devices via the same one or more networks 130, as previously described, or alternatively, as shown in at least FIG. 1 with respect to the magnetic card reader 201 and the printing device 202, at least some devices may communicate over multiple, separate networks configured in any of a variety of formats, as previously described herein.

The mobile device 200 may further be capable of storing data to one or more volatile or non-volatile memory modules, and outputting the data via one or more output units or devices, for example, by displaying data to the user operating the device, or by transmitting data, for example over the one or more networks 130 for verification and/or validation. One type of mobile device 200, which may be used in conjunction with embodiments of the present invention is the Motorola MC70, presently utilized by UPS, although any of a variety of commonly known and understood handheld computer devices may be incorporated as within the scope of the present invention. Similarly, one type of printing device 202, which may be used in conjunction with the mobile device 200 of the present invention is the Zebra QL 220 Bluetooth printer, presently utilized by UPS, although any of a variety of commonly known and understood mobile printing devices may be incorporated as within the scope of the present invention.

The remote terminal 100, in various embodiments, may be any device capable of receiving data via one or more input units or devices, such as a keypad, a touchpad, a barcode scanner, an RFID, an interface card (e.g., modem, etc.), and/or a receiver. The remote terminal 100 may further be capable of storing data to one or more volatile or non-volatile memory modules, and outputting the data via one or more output units or devices, for example, by displaying data to the user operating the terminal 100, or by transmitting data, for example, over the network 130. In certain embodiments, the remote terminal 100 is associated with the carrier at a location remote from the central server 300. In other embodiments, the remote terminal 100 is associated with a client or customer, also at a location remote from the central server 300. In at least one embodiment, the remote terminal 100 may be a register/payment terminal at a retail sales location counter, where, for example, at least a portion of customer payment may be received.

Mobile Device

In various embodiments, the mobile device 200 includes various means for performing one or more functions in accordance with embodiments of the present invention, including those more particularly shown and described herein. It should be understood, however, that the mobile device 200 may include alternative devices for performing one or more like functions, without departing from the spirit and scope of the present invention.

Figure 2:
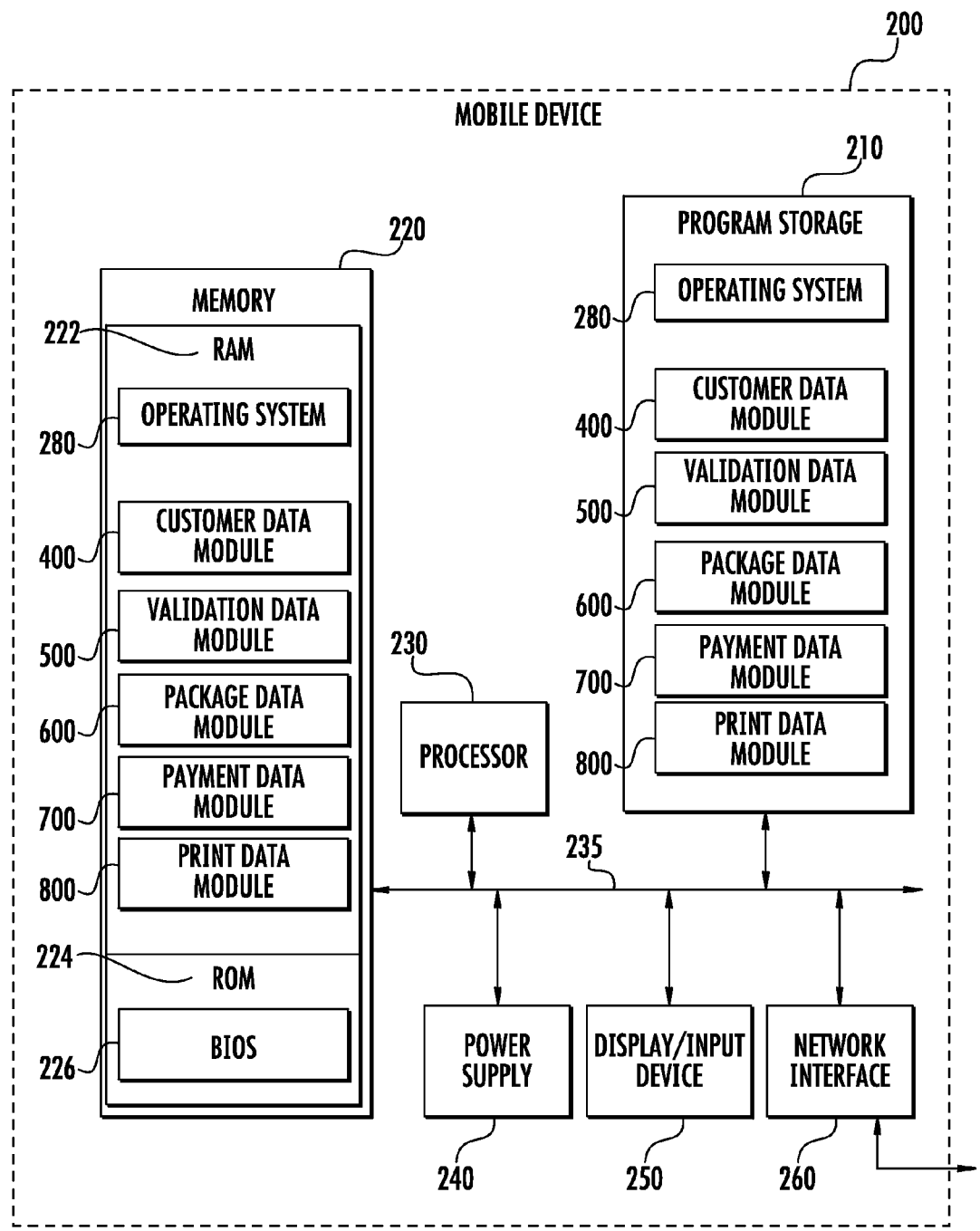
FIG. 2 is schematic block diagram of a mobile device server according to various embodiments of the exemplary mobile shipping system.

FIG. 2 is a schematic diagram of the mobile device 200 according to various embodiments. The mobile device 200 includes a processor 230 that communicates with other elements within the device via, for example, a system interface or bus 235. Also included in the mobile device 200 is a display/input device 250 for receiving and displaying data. This display/input device 250 may be, for example, a keyboard or scanning device that is used in combination with a monitor. The mobile device 200 further includes memory 220, which preferably includes both read only memory (ROM) 224 and random access memory (RAM) 222. The device's ROM 224 is used to store a basic input/output system 226 (BIOS), containing the basic routines that help to transfer information between elements within the mobile device 200.

In addition, the mobile device 200 includes at least one storage device 210 for storing information on various computer-readable media, such as the non-limiting examples of flash memory cards and/or SD cards. As will be appreciated by one of ordinary skill in the art, each of these storage devices 210 may be connected to the system bus 235 by an appropriate interface. The storage devices 210 and their associated computer-readable media provide nonvolatile storage for a personal and/or handheld computer. As will be appreciated by one of ordinary skill in the art, the computer-readable media described above could be replaced by any other type of computer-readable media known in the art. Such media include, for example, magnetic cassettes, CD-ROM disks, digital video disks, Bernoulli cartridges, etc.

A number of program modules may be stored by the various storage devices 210 and within RAM 222. Such program modules include an operating system 280, a customer data module 400, a validation data module 500, a package data module 600, a payment data module 700, and a print data module 800. According to various embodiments, the customer data module 400, the validation data module 500, the package data module 600, the payment data module 700, and the print data module 800 control certain aspects of the operation of the central server 200 with the assistance of the processor 230 and operating system 280.

In general, the customer data module 400 is configured to (i) receive, store, and provide data associated with a customer, and (ii) receive, store, and provide data associated with a recipient. The validation data module 500 is configured to activate a remote validation tool that, in turn, performs one or more hygiene cleansing processes on at least a received customer and/or recipient address. The package data module 600 is configured to receive, store, and provide data associated with a package. The payment data module 700 is configured to receive, store, and provide data associated with a customer's form of payment. The print data module 800 is configured to generate one or more of a shipping label, a pick ticket, and/or a receipt, depending upon various inputs received from at least the customer data module 400, the package data module 600, and the payment data module 700. Various embodiments of the logic employed by these modules are described in more detail below in relation to FIGS. 4-9, while various embodiments of user interface screens employed by these modules are described in more detail below in relation to FIGS. 10-16.

In a particular embodiment, these program modules 400, 500, 600, 700, and 800, are executed by and on the mobile device 200 and are configured to generate graphical user interfaces accessible to users of the system 5. In other embodiments, the user interfaces may be alternatively stored remotely such that they may be accessible via one or more networks 130, which may include the Internet or other feasible communications network, as previously discussed. In other embodiments, one or more of the modules 400, 500, 600, 700, and 800, such as, for example the non-limiting example of the payment data module 700 may alternatively, or in addition (e.g., as a mirror module) be stored locally on one or more remote terminals 100, and may be executed by one or more processors of the terminals 100. According to various embodiments, the modules 400, 500, 600, 700, and 800 may send data to, receive data from, and utilize data contained in a database, which may be comprised of one or more separate, linked and/or networked databases.

Also located within the mobile device 200 is a network interface 260 for interfacing and communicating with other elements of the one or more networks 130. It will be appreciated by one of ordinary skill in the art that one or more of the mobile device 200 components may be located geographically remotely from other mobile device 200 components. Furthermore, one or more of the mobile device 200 components may be combined, and/or additional components performing functions described herein may also be included in the mobile device 200.

While the foregoing describes a single processor 230, as one of ordinary skill in the art will recognize, the mobile device 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a single mobile "device" 200, as one of ordinary skill in the art will recognize, embodiments of the present invention are not limited to such architecture. The system of embodiments of the present invention is further not limited to a single device, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the mobile device 200 may likewise be used without departing from the spirit and scope of embodiments of the present invention.

Mobile Device Logic

Figure 3:
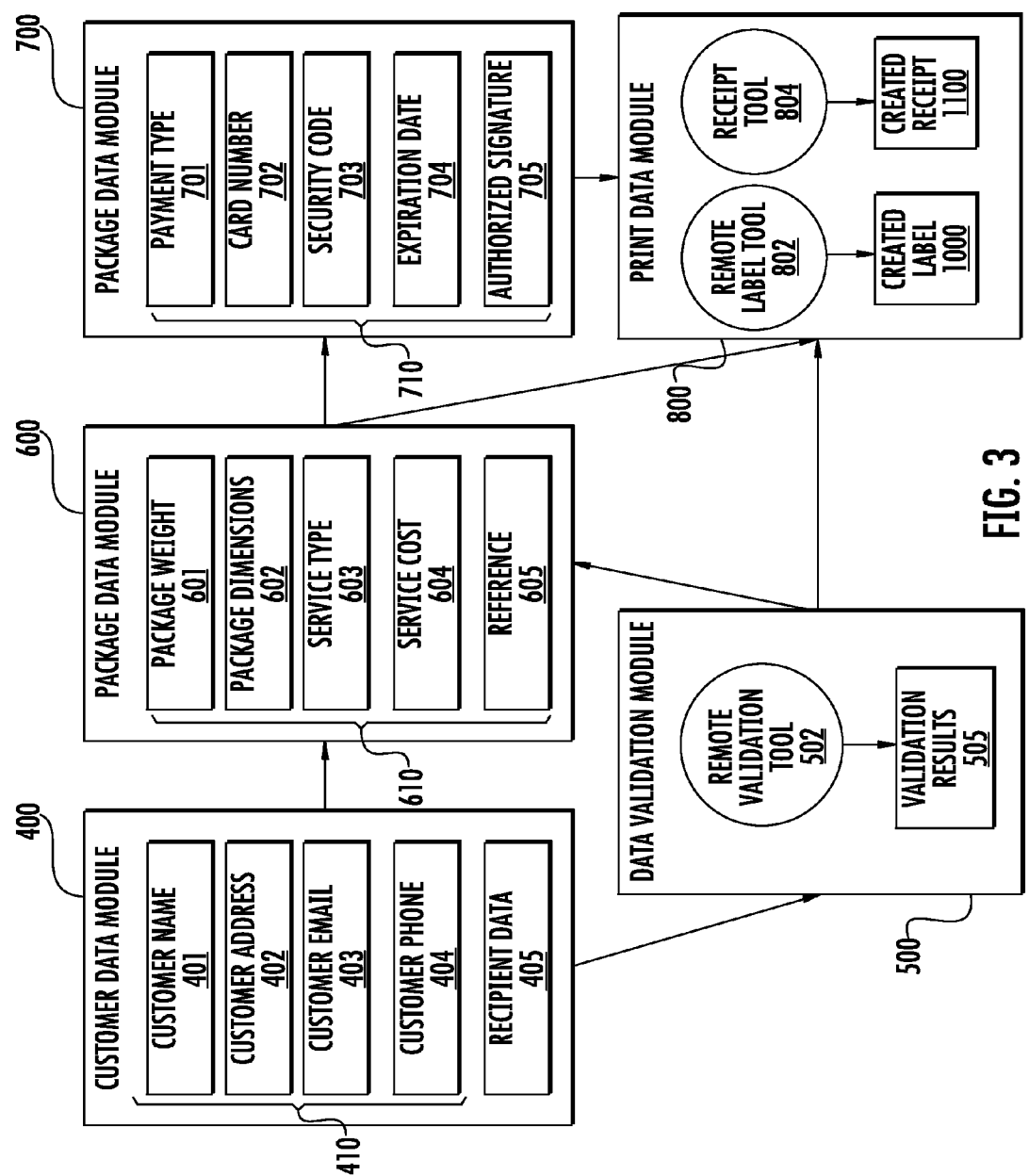
FIG. 3 is a more detailed schematic block diagram of the customer data module, the data validation module, the package data module, the payment data module, and the print data module, each shown in FIG. 2 according to various embodiments.
Figure 4:
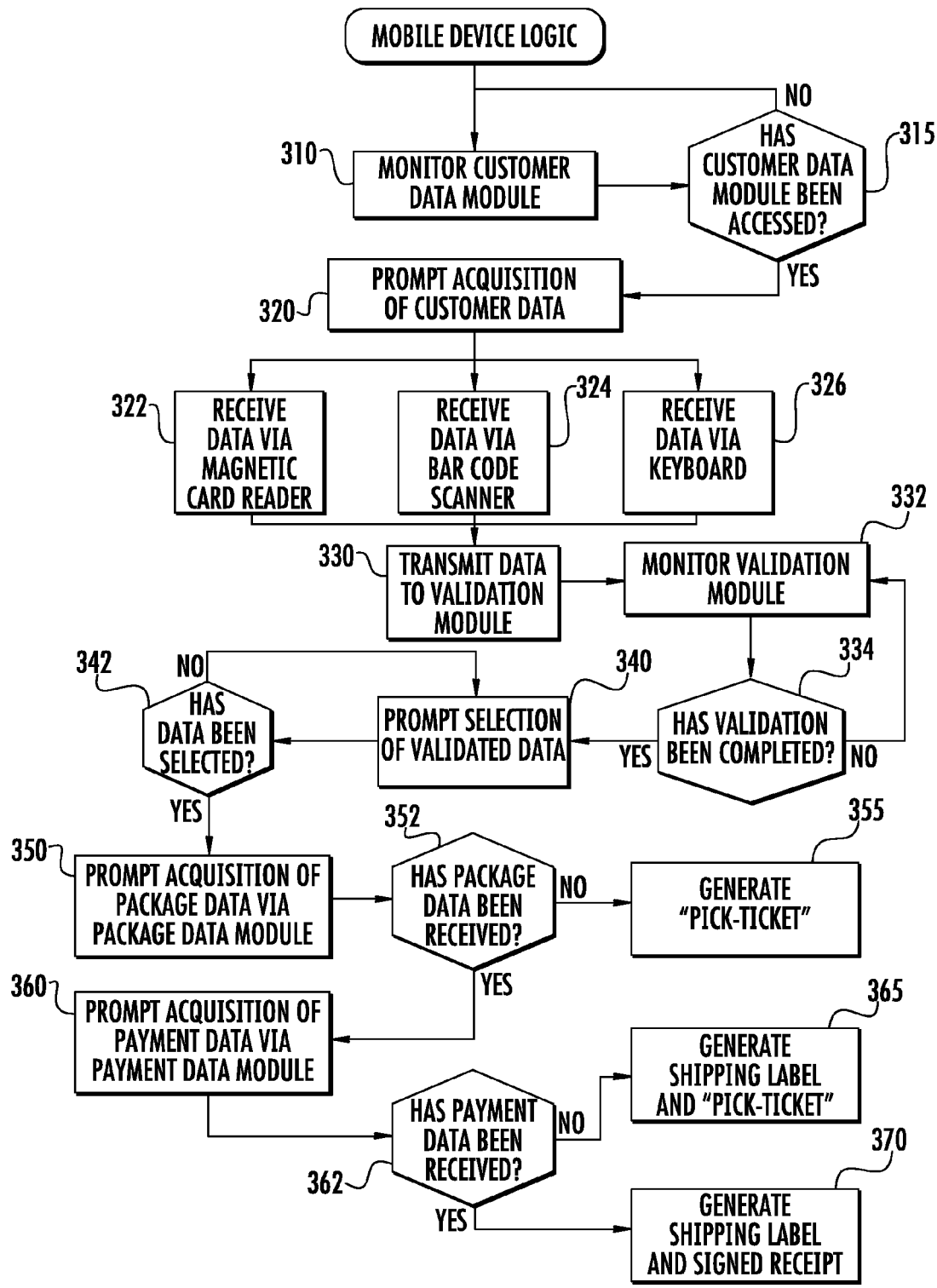
FIG. 4 is a flow diagram of steps executed by the mobile device server shown in FIG. 2 according to various embodiments.
Figure 10:
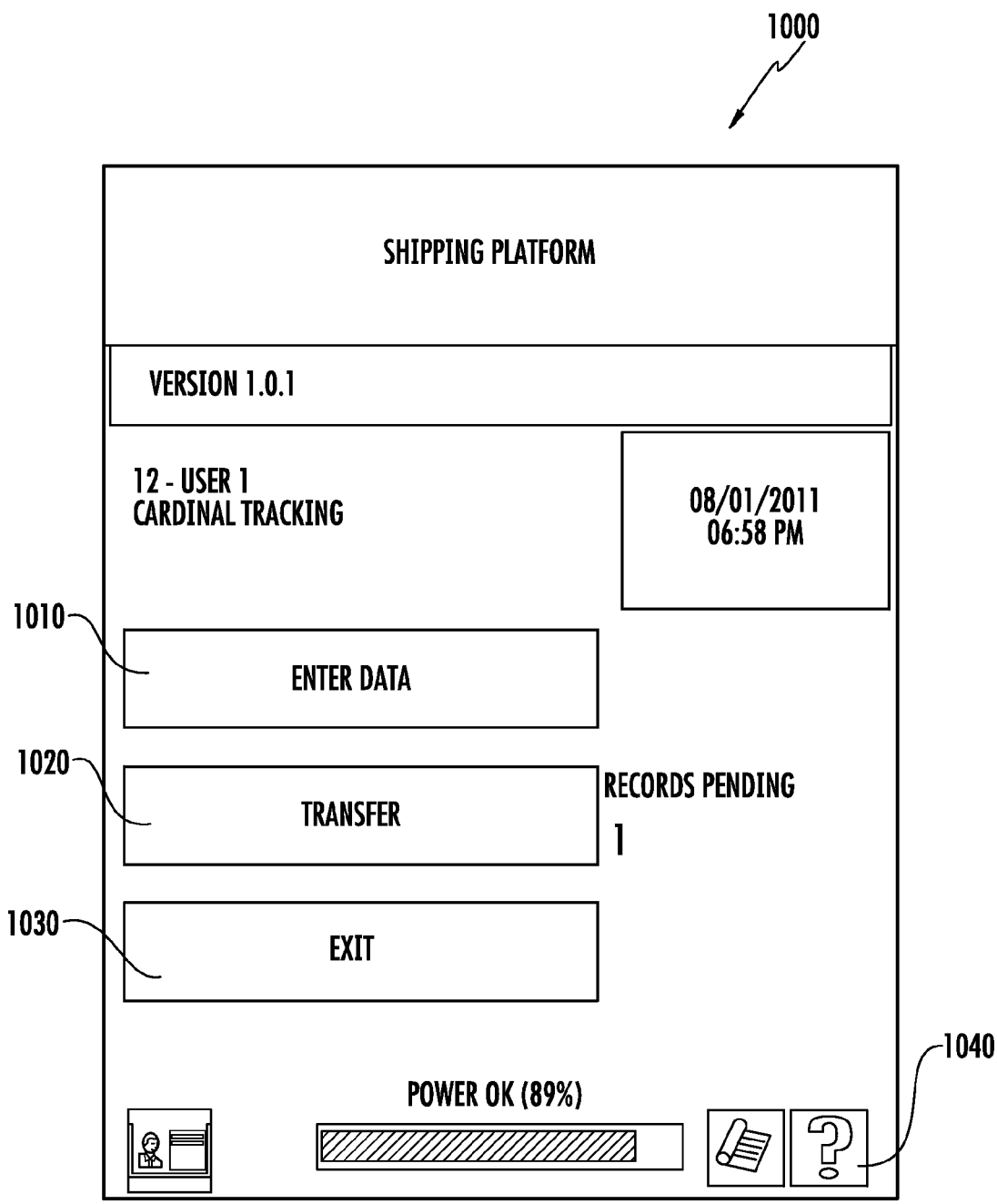
FIG. 10 is an exemplary main display screen of a handheld device of the mobile shipping system according to various embodiments.

FIG. 4 illustrates exemplary logical steps executed by the mobile device 200 to: (i) analyze any of a variety of data captured by and received from the data acquisition device 201, the mobile device itself, the remote terminal 100, and/or the central server 300; (ii) validate at least certain of the data captured and received; and (iii) generate one or more of a shipping label, a pick ticket for subsequent payment, and/or a receipt. Beginning with step 310, the mobile device 200, according to various embodiments, continually monitors the customer data module 400 to assess whether the latter has been received customer data 410, as shown in at least FIG. 3. If, in step 315, the mobile device 200 determines that no access has occurred, monitoring continues. In such instances, the mobile device 200 may according to certain embodiments continually display a main screen 1000, as shown in FIG. 10, which may be configured to permit user access to module 400, as will be described in further detail below. In other embodiments, the mobile device 200 may remain in a "standby" state, as commonly known and understood in the art, until the customer data module 400 is accessed. In any case, once the mobile device 200 determines that the customer data module 400 has been accessed, acquisition of customer data is prompted via step 320.

Acquisition of customer data 410 according to certain embodiments may be performed via a magnetic card reader in step 322, via a bar code scanner in step 324, and/or via a keyboard or touchscreen interface of the mobile device 200, as in step 326. Methods of customer data input may vary dependent upon a particular scenario or desired application; however, it should be understood that any of a variety of the above-mentioned devices may be employed to acquire any combination of any portion of the customer data 410 of, for example, FIG. 3. In certain embodiments, the customer data 410 may contain various pieces of information located on a customer's driver's license, and may include the non-limiting examples of a customer name 401 and a customer address 402. The customer data 410, according to various embodiments, may include, for example, further pieces of information such as a customer email 403, a customer phone number 404, and/or a variety of recipient information 405, if, for example such differs in any regard from the above customer data 410.

Returning to FIG. 4, if, after implementing step 320, the mobile device 200 determines that no customer data 410 has been received, the device may call the data acquisition device 201 for a status update. In certain embodiments, the status update, when received, may identify whether any customer data 410 was previously transmitted to the customer data module 400, but never received. In other embodiments, the mobile device 200 may also request re-transmittal of any customer data 410 identified as having been previously transmitted. In one embodiment, when back at step 320 for a second or subsequent time, if customer data 410 still is not received, the mobile device 200 may passively await receipt of the customer data. In another embodiment, when back at step 320 for a second or subsequent time, if the customer data 410 still is not received, the mobile device 200 will continually loop back through steps 322, 324, and/or 326 until customer data is received. In other embodiments (not shown), the mobile device 200 may call a remote terminal 100 instead of and/or in addition to the data acquisition device 201.

As previously described, when awaiting receipt of customer data 410, the mobile device 200 may remain in a "stand-by" mode, which according to at least certain embodiments may disable display of a main screen 1000, as illustrated in at least FIG. 10, until a user accesses the mobile device to provide customer data. However, in other envisioned embodiments, the main screen 1000 may remain active until a user actually enters some form of data, depending upon the needs and/or desires of a particular application. In still other envisioned embodiments, it should be understood that after a predetermined period of time or a predetermined number of queries, the mobile device 200 may discontinue altogether further monitoring activities in this regard. Such discontinuation of monitoring could essentially "cancel out" a transaction, as may be desirable for a particular application wherein, for example, a user decides not to purchase and ship a retail article, as will be described in further detail below.

If, during the process of executing steps 322, 324, and/or 326, the mobile device 200 determines that customer data 410 has been received at the customer data module 400, the device proceeds to step 330 and transmits at least a portion of the data to the data validation module 500. In step 332, the mobile device 200 according to particular embodiments continues to monitor the data validation module 500 subsequent to transmitting the portion of customer data to the same. The expectation is, in these and still other envisioned embodiments, that cleansed, standardized, and/or validated versions of at least a portion of the previously transmitted data will be returned to the customer data module 400 and/or the mobile device 200 in general by and from the data validation module and/or the remote validation tool 502, as will be further described in more detail below.

Once, in step 334, the mobile device 200 has received notification that validation of at least a portion of the transmitted customer data 410 has been completed, the mobile device 200 according to various embodiments proceeds to step 340, during which the mobile device prompts a user thereof to select at least certain portions of the validated data to replace the originally received and transmitted data. In certain embodiments, multiple versions (e.g., options) of validated data may be received, as described in further detail below, in which case, the mobile device 200 may, in step 340, prompt a user to select a particular option of validated data from the more than one options provided. As mentioned, such will be described in further detail below, with reference to at least FIGS. 6 and 13.

Remaining with FIG. 4, it may be seen that the mobile device 200 may, according to various embodiments, continually monitor in step 342 whether a user of the device has (or, alternatively, has not) selected validation data from the one or more options of the validation results 505, as shown in at least FIG. 3. In certain embodiments, it should be understood that the mobile device 200 may monitor such activity in a passive manner, perhaps even remaining in a "standby" state until such data is selected. In other embodiments, the mobile device 200 may be configured to behave substantially differently, for example, by actively re-prompting a user thereof to select a desired option of validated data so that the overall logic processing of FIG. 4 may proceed without undue delay. In still other envisioned embodiments, it should be understood that after a predetermined period of time, the mobile device 200 may discontinue monitoring activities in this regard. Such discontinuations of monitoring could essentially "cancel out" a transaction, as may be desirable for a particular application wherein, for example, a user decides not to purchase and ship a retail article, as will be described in further detail below.

Once validated data has been received and selected at the mobile device 200, the device proceeds to the steps 350 and 360, as may be envisioned according to certain applications in which consolidated purchase and shipment processes are desired. In these and still other envisioned embodiments, the step 350 prompts for user entry of various items of package data via the package data module 500. According to various embodiments, exemplary items of package data 610, as shown in at least FIG. 3, may include the non-limiting examples of a package weight 601, package dimensions 602, a service type 603, a service cost 604, and/or a reference number 605 such as a tracking or routing code. It should be understood that any portion or combination of the package data 610 may be acquired in a similar fashion as described above with regard to acquisition of customer data 410, namely in various combinations of steps 322, 324, and/or 326.

It should be further understood that in various embodiments, the customer may simply identify a product or package for purchase, in response to which the device 200 may scan or otherwise retrieve any of a variety of data 610 associated with that particular product or package. Of course, in other embodiments, the customer may manually or otherwise directly provide at least some portion, or even alternatively the entirety, of the data 610 associated with the particular product or package. In any event, if, after executing step 350, the mobile device 200 determines according to various embodiments that no package data 610 has been acquired, the device may call the data acquisition device 201 for a status update, which may be configured in any of the variety of manners as previously described herein. Monitoring and update activities in this regard may be implemented in, for example, step 352 via any of a variety of combinations of active, passive, and/or discontinuous monitoring methods, as likewise previously described herein.

Figure 18:
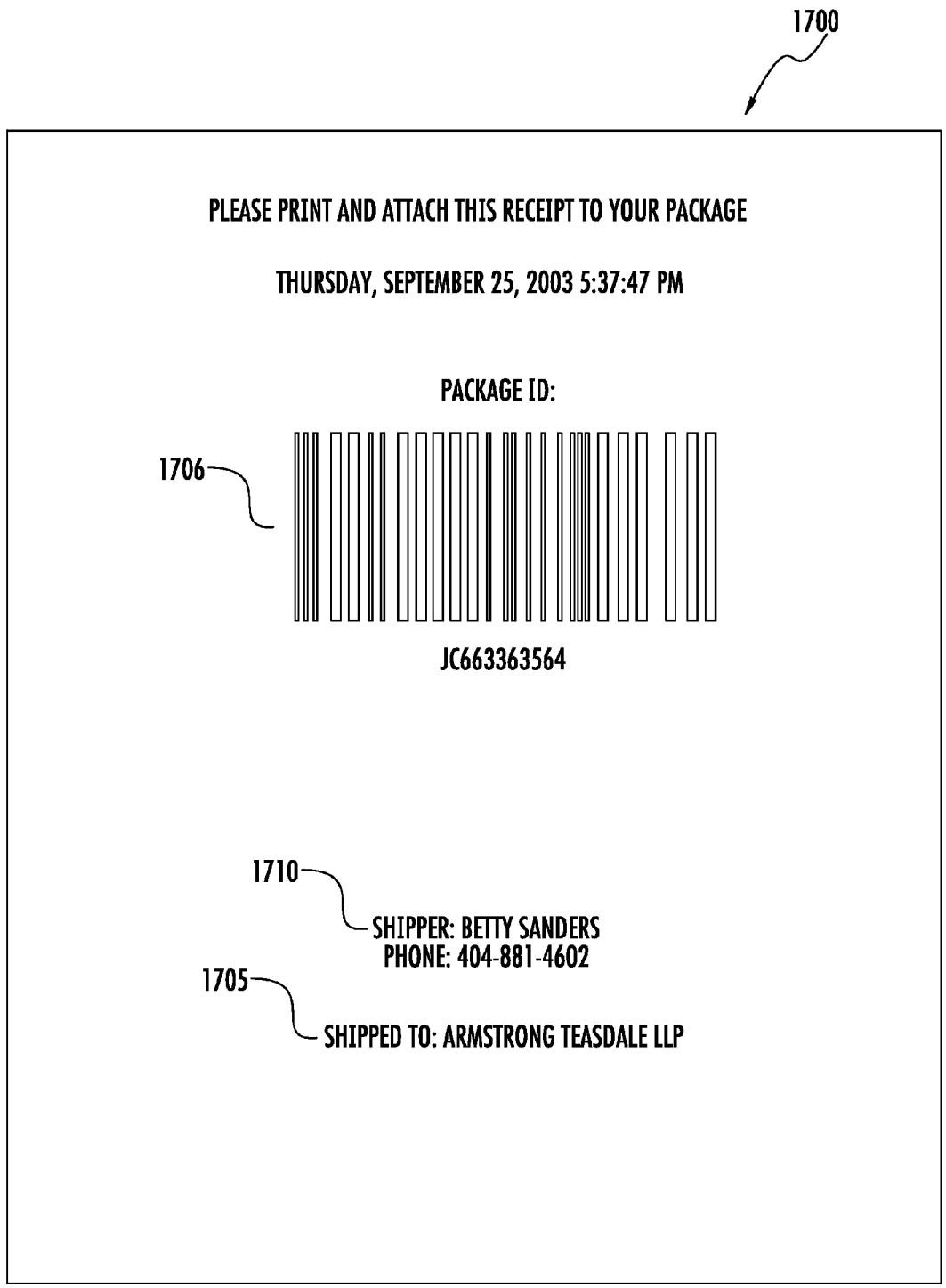
FIG. 18 is an exemplary ticket according to various embodiments.

It should be understood that in certain embodiments of the mobile device 200, package data 610 may not be received at all, as may be desirable for a particular end-use application. In such instances, provided customer data 410 has been previously received and/or validated, the mobile device may proceed nevertheless to execute step 355, as illustrated in at least FIG. 4. During execution of step 355 according to various embodiments, the mobile device 200 generates a "pick-ticket," which may according to certain embodiments, be carried out at least in part in conjunction with the print data module 800, as will be described in further detail below. In at least these envisioned embodiments, the logic executed by the mobile device 200 would thus be completed, in which case, according to a particularly envisioned application, a user of the device could take the generated "pick-ticket" along with a selected package to a traditional checkout counter for further assistance with shipment and payment. At least one exemplary "pick ticket" is illustrated in at least FIG. 18, as will be described in further detail below.

In those various further envisioned embodiments in which package data 610 is indeed received in step 352, regardless of how so, as will be described in further detail below, the mobile device 200 may according to various embodiments further proceed to execute step 360, in which a user of the device is further prompted (or alternatively permitted) to provide any combination of a variety of items that comprise payment data 710, as shown in at least FIG. 3. Such payment data 710 may, in certain embodiments include the non-limiting examples of payment type information 701, a card number 702, a security code 703, an expiration data 704, and an authorized signature 705 for use of the particular payment method. It should be understood that any portion or combination of the payment data 710 may be acquired in a similar fashion as described above with regard to acquisition of customer data 410 and/or package data 610, namely in various combinations of steps 322, 324, and/or 326.

In any event, if, after executing step 360, the mobile device 200 determines according to various embodiments that no payment data 710 has been acquired, the device may call the data acquisition device 201 for a status update, which may be configured in any of the variety of manners as previously described herein. Monitoring and update activities in this regard may be implemented in, for example, step 362 via any of a variety of combinations of active, passive, and/or discontinuous monitoring methods, as likewise previously described herein.

Figure 17:
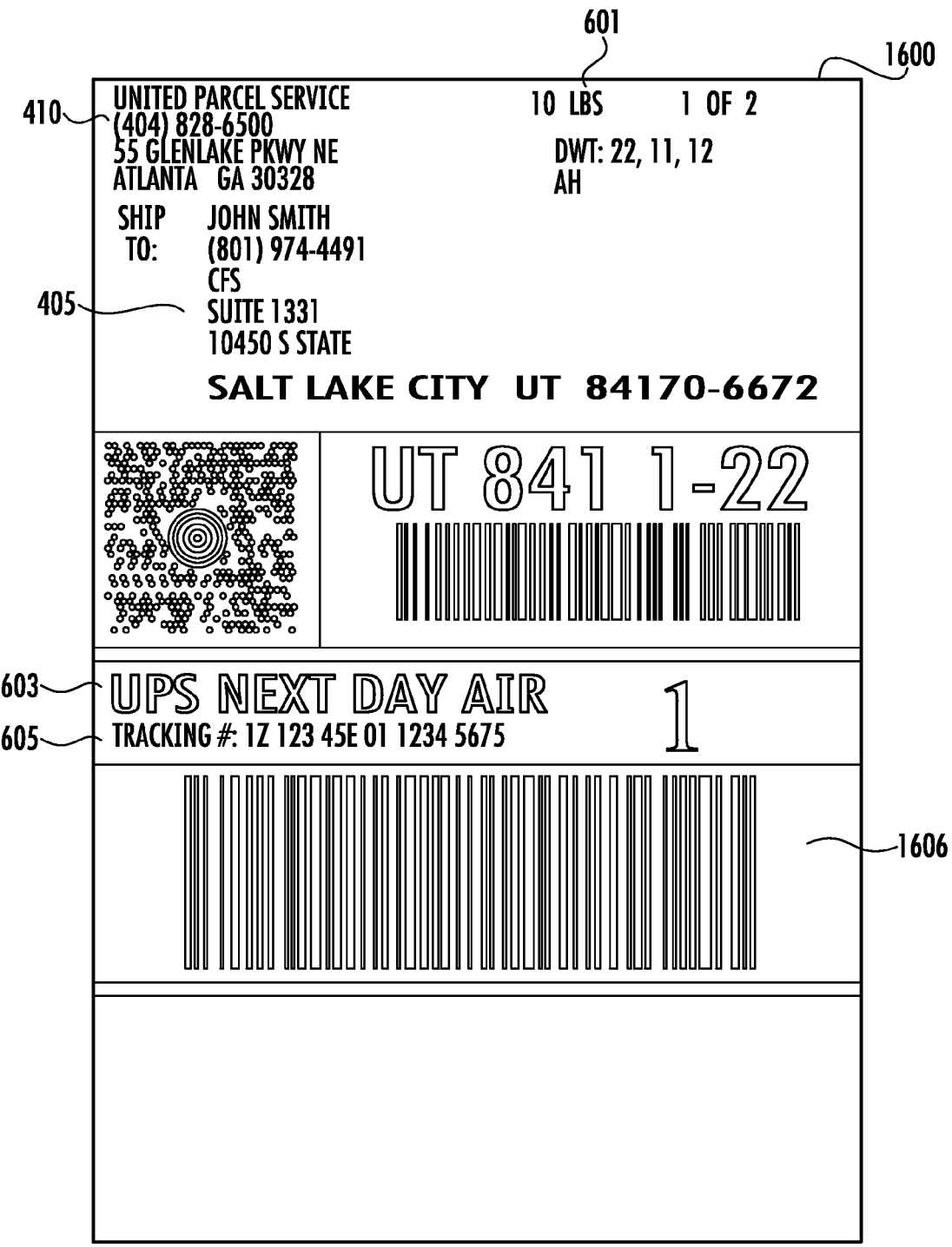
FIG. 17 is an exemplary shipping label according to various embodiments.

It should be understood that in certain embodiments of the mobile device 200, payment data 710 may not be received at all, as may be desirable for a particular end-use application. In such instances, provided at least customer data 410 and package data 610 has been previously received and/or validated, the mobile device may proceed nevertheless to execute step 365, as illustrated in at least FIG. 4. During execution of step 365 according to various embodiments, the mobile device 200 generates not only a "pick-ticket," as it may be likewise configured to do in step 355, as previously described herein, but also a shipping label. The generation of both items may, according to certain embodiments, be carried out at least in part in conjunction with the print data module 800, as will be described in further detail below. In at least these envisioned embodiments, the logic executed by the mobile device 200 would thus be completed, in which case, a user of the mobile device could affix the generated shipping label, an example of which is illustrated in at least FIG. 17, to the package associated with the received package data 610. In these and still other envisioned embodiments, the user could take the labeled package to a traditional, or otherwise configured, checkout counter for further assistance with shipment and, in particular, payment.

In those various further envisioned embodiments in which payment data 710 is indeed received in step 362, regardless of how so, as will be described in further detail below, the mobile device 200 may according to various embodiments further proceed to execute step 370. During step 370, the mobile device may according to various embodiments generate not only a signed receipt, together with a shipping label, the latter of which, as generated in at least step 365. It should be understood generally that, as payment data has been received and/or processed, the mobile device 200, when executing step 370 need not generate a "pick ticket," as previously would have been done in at least steps 355 and 365. The generation of either or both of the shipping label and the signed receipt may, according to certain embodiments, be carried out at least in part in conjunction with the print data module 800, as will be described in further detail below. In at least these envisioned embodiments, the logic executed by the mobile device 200 would thus be completed, in which case, a user of the mobile device could affix the generated shipping label, an example of which is illustrated in at least FIG. 17, to the package associated with the received package data 610. In these and still other envisioned embodiments, the user could then retain their signed receipt for future reference, as may be desirable for a particular application.

Customer Data Module

According to various embodiments, as illustrated in FIG. 3, the customer data module 400 is configured to (i) receive, store, and provide data associated with a customer, and (ii) receive, store, and provide data associated with a recipient.

Figure 5:
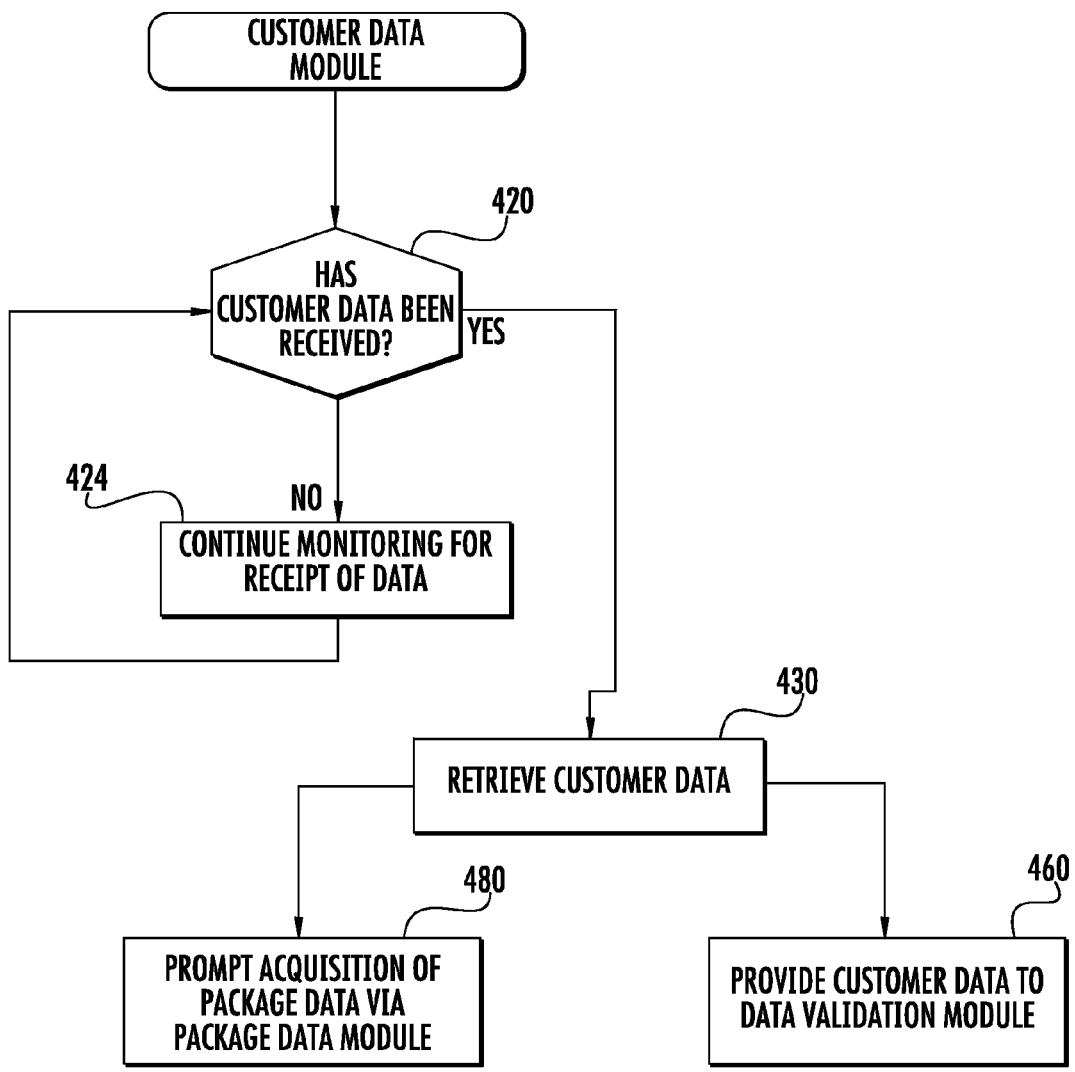
FIG. 5 is a flow diagram of steps executed by the customer data module shown in FIG. 2 according to various embodiments.

FIG. 5 illustrates exemplary steps executed by the customer data module 400 according to various embodiments. Beginning with step 420, the customer data module 400 of certain embodiments assesses whether data 410 (see FIG. 3) associated with a customer (which may or may not also be a user of the mobile device 200) has been received by the module. In various envisioned embodiments, the data module 400 makes this assessment by scanning one or more data tables associated with the module and identifying customer data 410 within the data tables that was not present during a previous assessment likewise performed under step 420.

If, in various embodiments, execution of step 420 by the customer data module 400 determines that no new customer data 410 has been received, the customer data module proceeds, in step 424, to continue monitoring for receipt of such data. As previously described herein, such monitoring may, in certain embodiments be continuous in nature, while in other embodiments, such may be periodic, as may be desirable for a particular application. As a non-limiting example, a proprietor making use of such mobile devices 200 during the course of operating a business may configure the devices to automatically query for new or updated customer data 410, so as to avoid undue burdens upon associated systems if such queries were performed less frequently (e.g., hourly or otherwise). Further, such monitoring may, in still other embodiments be passive, although in other envisioned embodiments, the module 400 may be configured to actively query one or more databases for new customer data 410. In at least one embodiment (not shown), the data module 400 may query a remote terminal 100 and/or a central server 300 or the like, regarding customer data 410 instead of and/or in addition to querying the data acquisition device 201.

In various embodiments, the customer data 410 received in step 420 and subsequently retrieved in step 430 may include a variety of information commonly associated with an individual driver's license or identification card. As best understood from FIG. 3, the customer data 410 may include at least a customer name 401, a customer address 402, a customer email 403, a customer phone 404, and recipient data 405. According to certain embodiments, at least the customer name 401 and the customer address 402 may be acquired by a scan of the customer's driver's license (or, alternatively, as the case may be, identification card). In various embodiments, such may be performed by the mobile device 200 in conjunction with a data acquisition device 201, as has been previously generally described herein.

As mentioned, according to various embodiments, the mobile device 200 may be configured with a data acquisition device 201 so as to acquire some portion of the desired customer data 410 directly from the customer's driver's license. In certain embodiments, the data acquisition device 201 may be integrally formed as at least a portion of the mobile device itself, while in other envisioned embodiments, the two devices may be separately manufactured and configured, as in at least FIG. 1. In any of these "separate" embodiments, the two devices may be removably attached or merely positioned relatively adjacent or nearby, relative to one another, as a particular application may desire. In this manner, the two devices 200, 201 may efficiently and effectively communicate data there-between, as has also been described previously herein.

Returning to further details surrounding the execution of step 430 of FIG. 5 according to various embodiments, it should be understood that the data acquisition device 201, however physically configured, may substantially comprise a magnetic card reader. Such magnetic card readers, as commonly known and understood in the art, may be configured to read a variety of data from magnetic strips located on a variety of scanned sources, including the non-limiting examples of driver's licenses, identification cards, banking and credit cards, and the like. In any of these and other envisioned embodiments, the magnetic card reader may be configured to retrieve at least a portion of the customer data 410 directly from a scan of the magnetic strip located on, for example, the customer's driver's license. In still other envisioned embodiments, the data acquisition device 201 may concurrently, or alternatively, comprise one or more of a two-dimensional imager and a bar code scanner, as such may prove beneficial for acquiring customer data from driver's licenses and other customer data sources, which may or may not incorporate a magnetic strip, as previously described.

Figure 11:
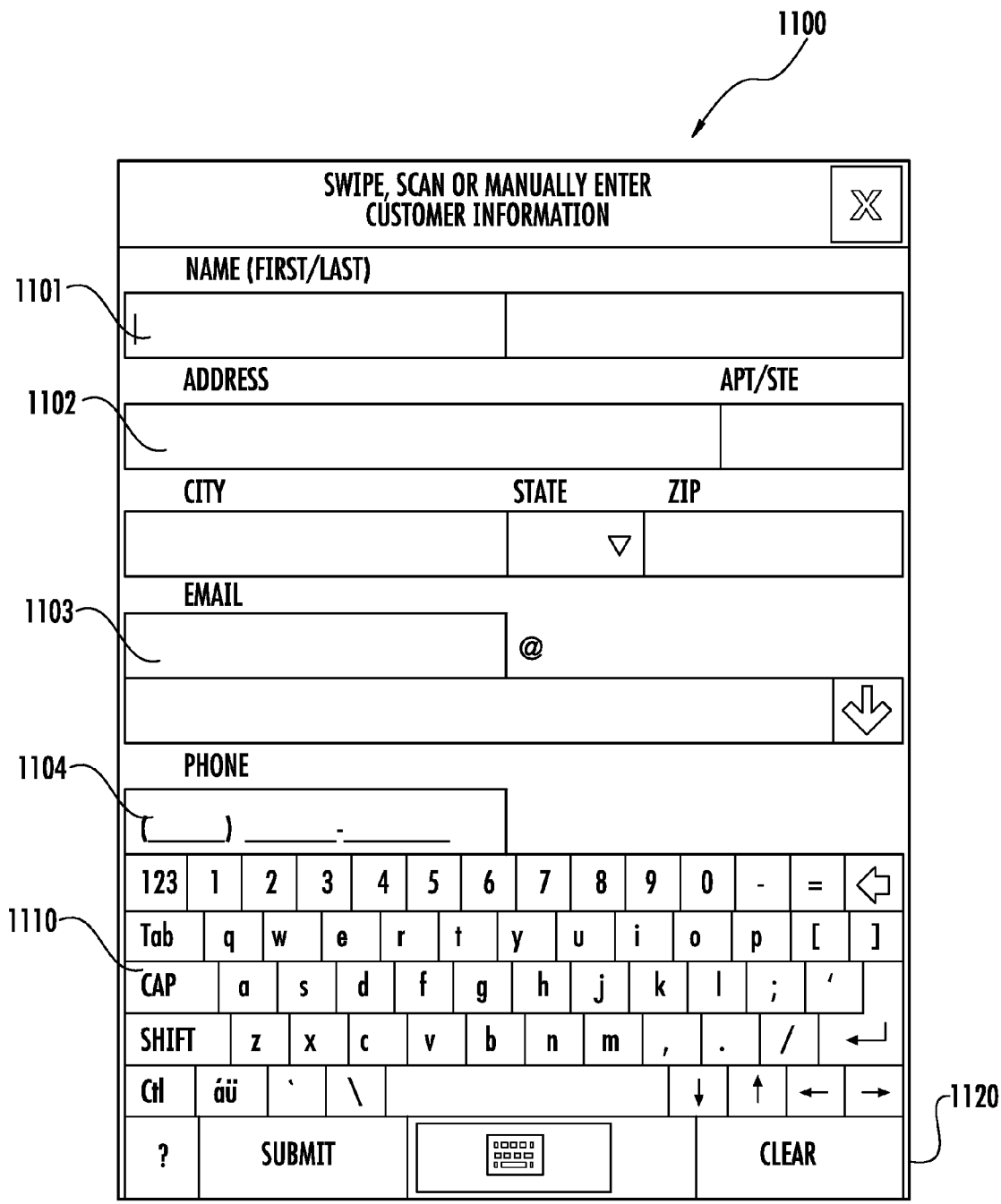
FIG. 11 is an exemplary customer data entry screen of a handheld device of the mobile shipping system according to various embodiments.
Figure 12:
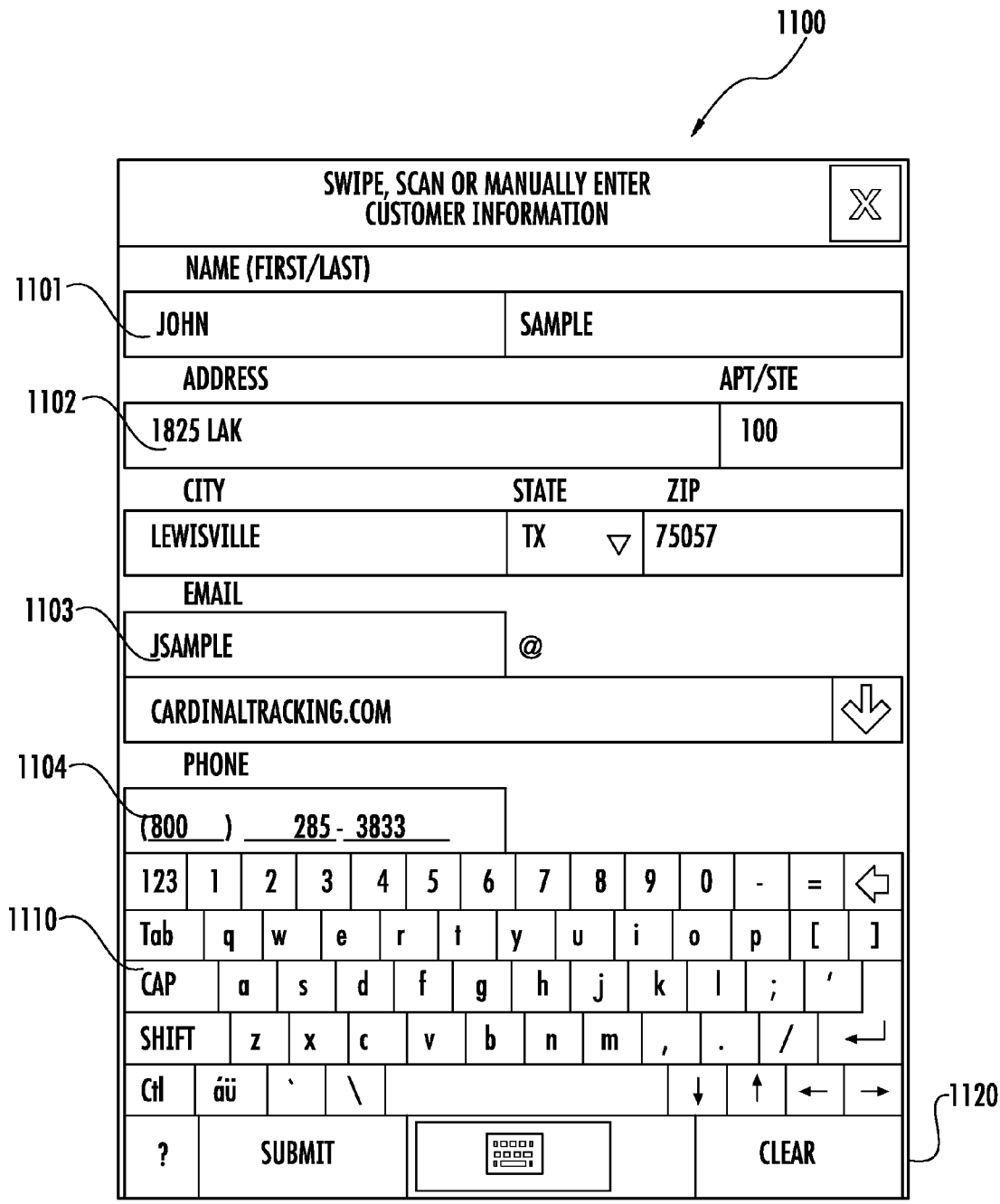
FIG. 12 is an exemplary view of the customer data entry screen shown in FIG. 11, but with populated customer data fields according to various embodiments.

The mobile device 200 may, in the various embodiments comprising a data acquisition device 201, further comprise an integrated customer data entry screen 1100, as illustrated in at least FIG. 11. As may be seen from that figure, a user wishing to populate certain of the various displayed customer data fields, namely customer name field 1101, customer address field 1102, customer email field 1103, and/or customer phone field 1104 may manually enter any combination or portion of those fields via the mobile device 200 itself. For example, in at least the illustrated embodiment of FIG. 11, the mobile device 200 may incorporate a touchscreen display screen that includes an on screen input 1110 capable of receiving user-typed data into each of the respective fields. Still other envisioned embodiments of the mobile device 200 may, instead of a touchscreen display screen, use an external keyboard or otherwise configured input device, such as, for example, the remote terminal 100 for manual entry of particular fields of data. Of course, manual entry of any of the various customer data fields may be configured in any of a variety of manners, as generally may be commonly known and understood in the art.

Where manual entry of at least a portion of the customer data 410 is performed according to various embodiments, such may be done in conjunction with acquisition of data via the data acquisition device 201 (e.g., the magnetic card reader). However, in other envisioned embodiments, the acquisition of customer data manually may be preferable, or even necessary, depending on various external factors. For example, a user of the device 200 may encounter a customer having an unreadable source of customer data, whether a damaged magnetic strip upon a driver's license or merely a previously unrecognizable data encryption format. In such a scenario, the device 200 according to various embodiments may acquire the necessary customer data 410 via alternative methods, whether via manual entry, as previously described, or otherwise. As such, it should be understood that not only do the various concurrent and/or alternative devices for facilitating data acquisition provide various alternative user options, such also serve as backup or safety mechanisms should primarily relied upon options fail.

Once the customer data module 400 determines that new customer data 410 has been received, whether via the data acquisition device 201 or otherwise, the module proceeds to steps 460 and 480. In various embodiments, during step 460, the customer data module 400 provides (e.g., transmits) at least a portion of the customer data 410 to the validation module 500. As will be discussed in further detail below in relation to FIGS. 3 and 6, the validation module 500 is generally configured to cleanse, standardize, and/or validate at least a portion of the customer data transmitted to its module. In various embodiments, during step 480, the data module 400 may further prompt the user to provide package data 610 to the package data module 600, as will be described in further detail below. In certain embodiments, user prompted acquisition of package data 610 may occur concurrently with the steps performed by the data validation module 500, as likewise described below. In other embodiments, as may be desirable for particular applications, acquisition of the package data 610 may be deferred until after the module 500 validates at least a portion of the customer data 410.

In various embodiments, as has been alluded to above, the customer data module 400 may be configured to receive or acquire, whether actively or in a more passive manner, recipient data 405. Such recipient data 405 may be necessary, in certain embodiments, where, as a non-limiting example, the customer with whom the customer data 410 is associated wishes to ship the purchased retail article to a third party recipient. In still other embodiments, it may be that the customer's scanned address 402, or some variety or combination of the customer data 410 may be different from an address to which the customer wishes the item shipped (e.g., if the address 402 is a post office box, but shipment is desired to a street address, or alternatively, to a customer's business address).

In any of these envisioned embodiments, it should be understood that the recipient data 405 may be acquired by the customer data module 400 in any of the previously described manners, as may be desirable or most practical for a particular scenario or application. It should also be understood, as will be described in further detail below, that when such recipient data 405 is acquired by the module 400, such may be transmitted by the module 400 to the data validation module 500 in conjunction with, or alternatively, in place of, a portion of the customer data 410. User selection of which data is so transmitted, including whether recipient data 405 is acquired at all may be facilitated according to various embodiments by the non-limiting exemplary customer data entry screen 1100, as shown in at least FIGS. 11 and 12 and described in further detail below.

Data Validation Module

According to various embodiments, as shown in FIG. 3, validation data module 500 is configured to activate a remote validation tool 502 that, in turn, performs one or more hygiene cleansing processes on at least a received customer and/or recipient address.

In various embodiments, the remote validation tool 502 comprises one or more software programs that generally reside on centralized frameworks, such as that of the central server 300 of FIG. 1. In certain embodiments, the validation tool 502 may comprise merely a portion of a consolidated package of programs, such as the non-limiting example of UPS Online Tools. UPS Online Tools are generally available in both XML (eXtensible Markup Language) and HTML formats and typically includes at least the following tools: package tracking; rates & service selection; time in transit calculator; address validation; signature tracking; and custom shipping. As such, it should be understood that according to various envisioned embodiments, the validation tool 502 may comprise the UPS Online Address Validation Tool, various aspects of which are generally described in U.S. Patent App. Pub. No. 2002/0196944, which is incorporated by reference herein in its entirety. As a non-limiting example, the UPS Online Address Validation Tool may validate that an input city, state, postal code combination is consistent, and return a list of up to ten (10) valid city-state-postal code combinations that closely match the input data. In other envisioned embodiments, however, the validation tool 502 may comprise any of a variety of address validation tools, as commonly known and understood in the art as being capable of cleansing at least portions of address-related data.

Figure 6:
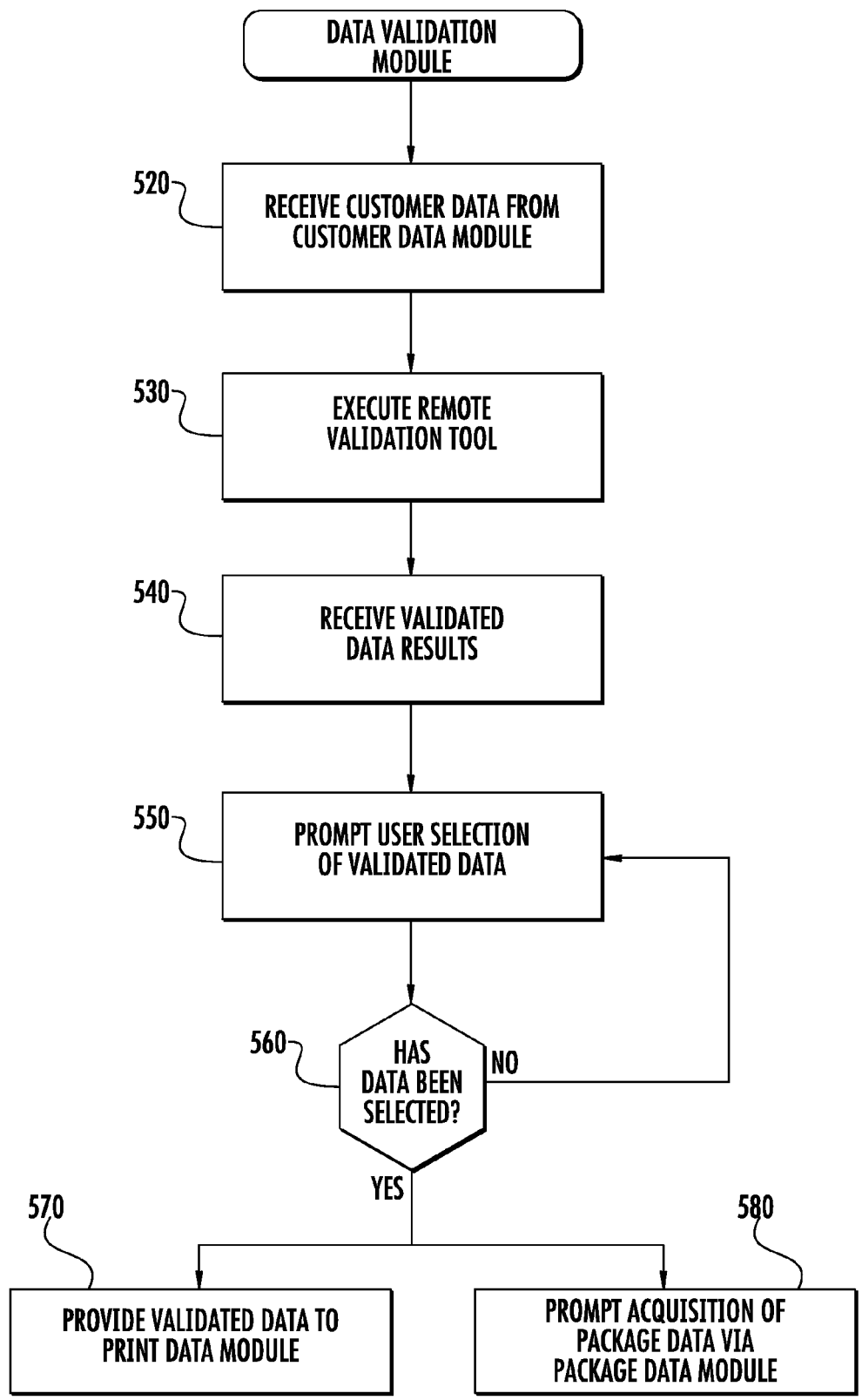
FIG. 6 is a flow diagram of steps executed by the data validation module shown in FIG. 2 according to various embodiments.

FIG. 6 illustrates exemplary steps executed by the data validation module 500 according to various embodiments. Beginning with step 520, the data validation module 500 receives at least a portion of the customer data 410 from the customer data module 400. In certain embodiments, the data validation module 500 requests the data from the customer data module 400, while in other embodiments, the customer data module 400 transmits the data automatically without request from the data validation module 500. In at least the illustrated embodiment (see also FIG. 3), at least the customer address 402 is transmitted to the data validation module 500. In other embodiments, it should be understood that, instead of the customer address 402, an address-related portion of the recipient data 405 may be transmitted, as previously described herein. In still other embodiments, the customer address 402 and the address-related portion of the recipient data 405 may both be transmitted. Still further envisioned embodiments may transmit additional data, as may be desirable for a particular application.

In any event, according to various embodiments, once at least a portion of customer data 410 (and/or the recipient data 405, as may be appropriate) has been received by the data validation module 500, the module proceeds to step 530, wherein the remote validation tool 502 is activated. In certain embodiments, activation of the remote validation tool 502 involves the module 500 communicating with the central server 300, where upon a plurality of tools, including the validation tool 502, may be stored, as previously described herein. In other embodiments, the central server 300 may have to further communicate with additional servers or infrastructure to access the tool 502, depending on a particular application and design. In any of these embodiments, however, it should be understood that the validation tool 502 is generally not located upon the mobile device 200, although still other embodiments may incorporate any of a variety of mobile applications or widgets through which the tool 502 may be remotely accessed.

In those embodiments wherein the data validation module 500 proceeds through step 530 by activating and/or contacting the validation tool 502, as however may be the case, the data validation module 500 according to various embodiments next executes step 540 (see FIG. 6), during which it receives a set of validated data results 505 (see FIG. 3) from the tool. In certain embodiments, as has been described herein with regard to the customer data module 400, the validation module 500 may be configured to passively await receipt of the validated data results in step 540. In other embodiments, however, it should be understood that the validation module 500 may be configured to continually, or alternatively periodically, query the tool 502 for receipt of results 505.

Figure 13:
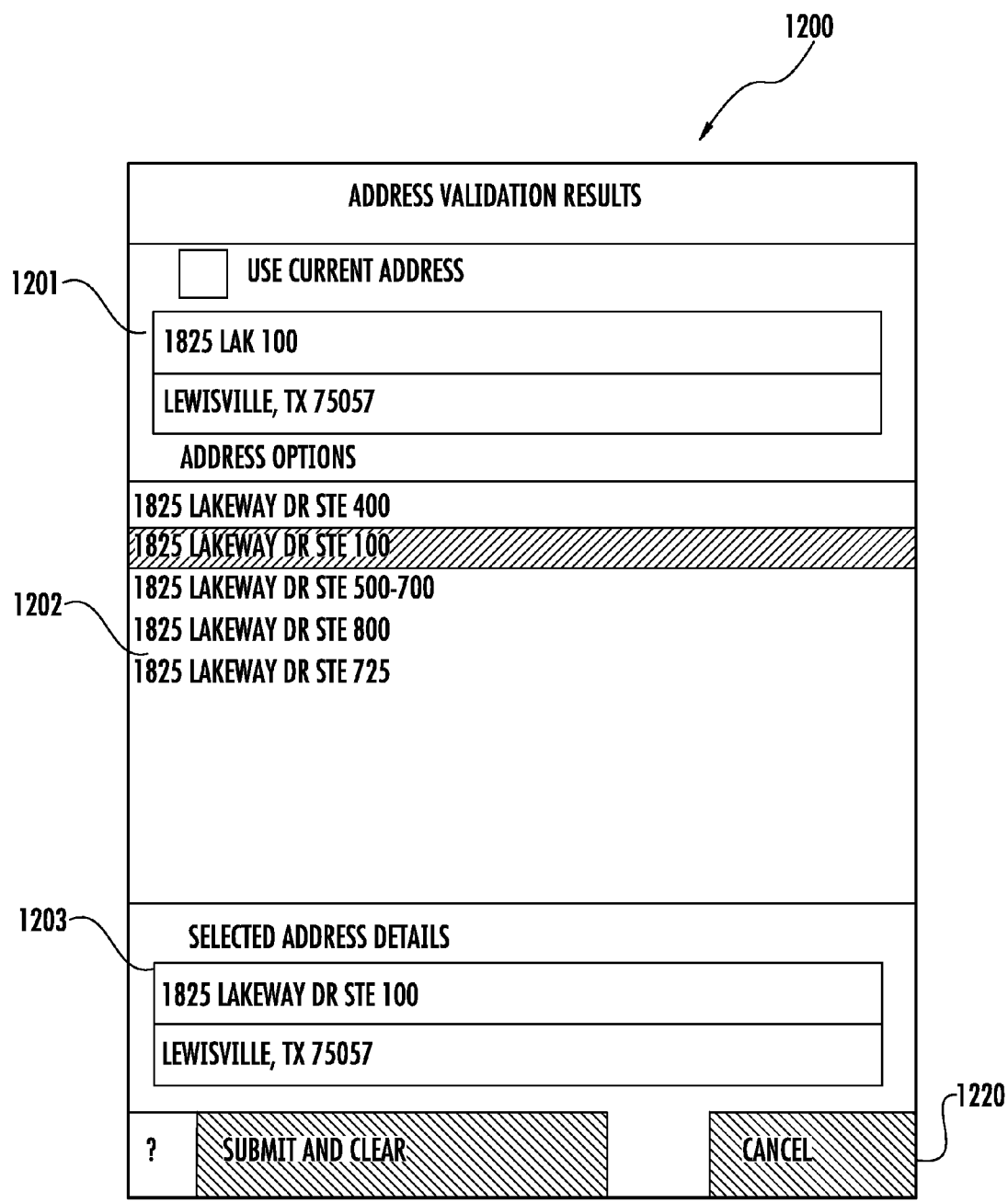
FIG. 13 is an exemplary data validation screen of a handheld device of the mobile shipping system according to various embodiments.

Once the data validation module 500 receives the set of validated data results 505 from the validation tool 502, the module is then configured, according to various embodiments, to prompt a user to select one of the displayed options within the set of results, as illustrated in an exemplary data validation screen 1200 of FIG. 13, which will be described in further detail below. In certain embodiments, the set of results 505 may include a plurality of options, while in other embodiments only a single result option may exist. Further, in still other envisioned embodiments, although a single or multiple results 505 may be returned by the validation tool 502, a user, when prompted to select one of the results may also be given an option to reject all of the results, essentially selecting to use the originally input data 410 and/or 405. Various embodiments of this nature, as envisioned within the scope of the present invention, will be described in further detail below with reference to at least FIG. 13, which illustrates an exemplary user interface screen 1200 for the execution of step 540 by the data validation module 500.

Returning to FIG. 6, the data validation module 500 according to various embodiments may be configured, as was the customer data module 400, to passively await receipt of the validated data results in step 560. In other embodiments, however, it should be understood that the validation module 500 may be configured to continually, or alternatively periodically, query the user for selection of the results 505 or, alternatively, of originally input customer data 410.

Once the data validation module 500 according to various embodiments has received a user selection, whether of a particular subset of the set of validated results 505 or, alternatively, of originally input customer data 410, as previously described, the module proceeds to steps 570 and 580. In certain embodiments, during step 570, the data validation module 500 provides (e.g., transmit) at least the selected validated data results 505 to the print data module 800. In other embodiments, during step 570, the data validation module 500 may further provide (e.g., transmit) additional portions of, or alternatively and entirety of the customer data 410 and/or any acquired recipient data 405 to the print data module 800, as may be desirable for a particular application.

According to various embodiments, during step 580, the data validation module 500 may further prompt the user to provide package data 610 to the package data module 600, as will be described in further detail below. In certain embodiments, as described previously herein, user prompted acquisition of package data 610 may occur concurrently with the steps performed by the data validation module 500. However, in various other envisioned embodiments, as may be desirable for particular applications, acquisition of the package data 610 may be deferred until after the module 500 has performed at least steps 520, 530, 540, 550, and 560, as described immediately above.

Package Data Module

According to various embodiments, as shown in FIG. 3, package data module 600 is configured to receive, store, and provide data associated with a package.

Figure 7:
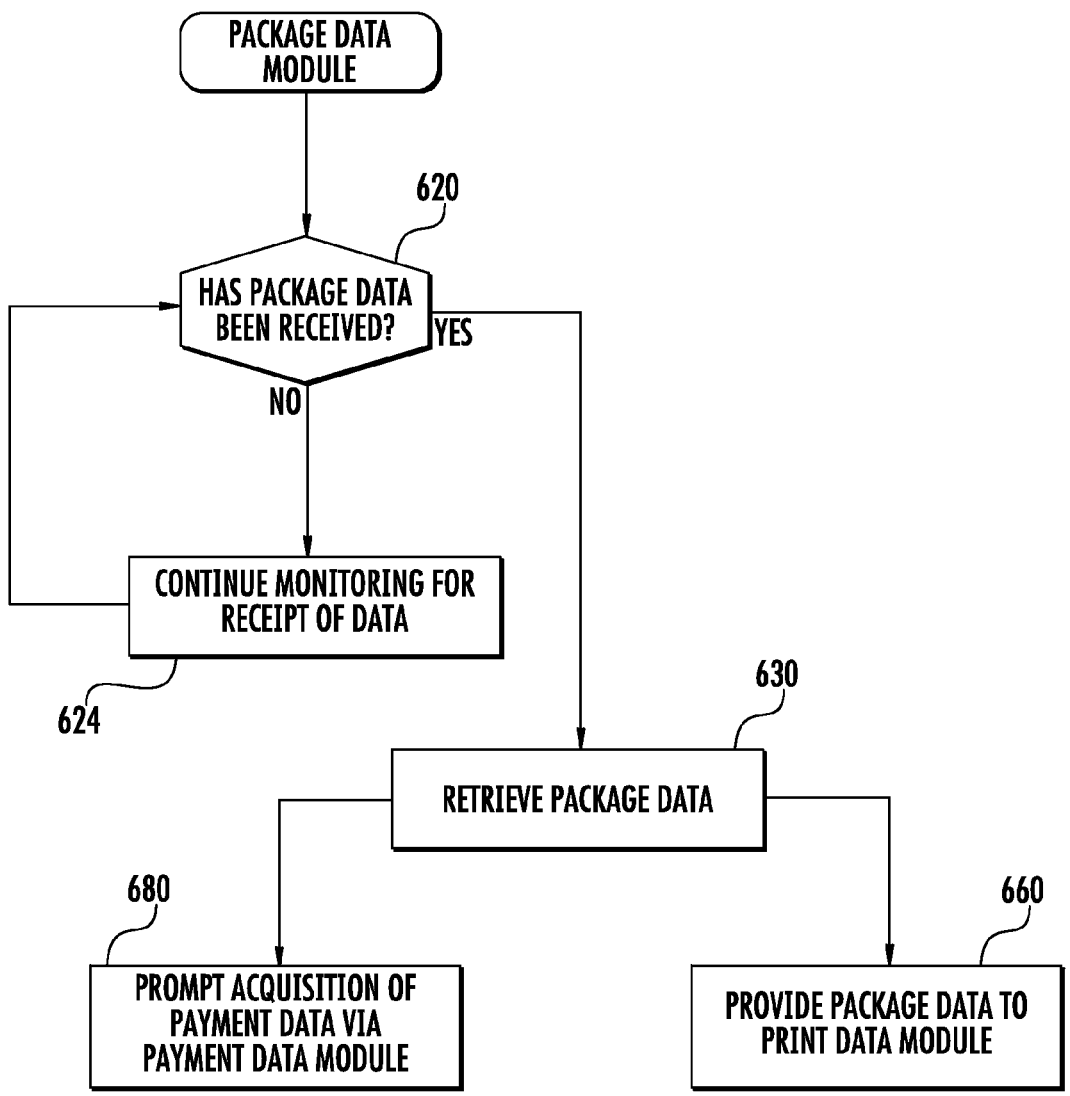
FIG. 7 is a flow diagram of steps executed by the package data module shown in FIG. 2 according to various embodiments.

FIG. 7 illustrates exemplary steps executed by the package data module 600 according to various embodiments. Beginning with step 620, the package data module 600 of certain embodiments assesses whether data 610 (see FIG. 3) associated with a package (which may comprise one or more retail articles purchased by a user/customer of the mobile device 200) has been received by the module. In various envisioned embodiments, the package data module 600 makes this assessment by scanning one or more data tables associated with the module and identifying package data 610 within the data tables associated with a particular set of customer data 410, as previously described herein, that was not present during a previous assessment likewise performed under step 620.

If, in various embodiments, execution of step 620 by the package data module 600 determines that no new package data 610 has been received, the package data module proceeds, in step 624, to continue monitoring for receipt of such data. As previously described herein, such monitoring may, in certain embodiments be continuous in nature, while in other embodiments, such may be periodic, as may be desirable for a particular application. As a non-limiting example, a proprietor making use of such mobile devices 200 during the course of operating a business may configure the devices to automatically query for new or updated package data 610, so as to avoid undue burdens upon associated systems if such queries were performed less frequently (e.g., hourly or otherwise). Further, such monitoring may, in still other embodiments be passive, although in other envisioned embodiments, the module 600 may be configured to actively query one or more databases for new data 610. In at least one embodiment (not shown), the package data module 600 may query a remote terminal 100 and/or a central server 300 or the like, regarding package data 610 instead of and/or in addition to querying the data acquisition device 201.

In various embodiments, the package data 610 received in step 620 and subsequently retrieved in step 630 may include a variety of information commonly associated with a package configured for shipment from one initial location to an ultimate destination. As best understood from FIG. 3, the package data 610 may include at least a package weight 601, package dimensions 602, a service type 603, a service cost 604, and a reference field 605. However, it should be understood that various envisioned embodiments may include still other types and values of package data, as may be desirable for a particular application or purpose, and such should be considered, nevertheless, within the scope of the present invention.

It should be understood that according to various embodiments, certain package data 610 may include combinations of data related to not only a shipping package, but also the one or more retail articles associated with (e.g., placed within) the package. As a non-limiting example, in certain embodiments, the package weight 601 may comprise a summation of not only the weight of the empty package box itself, but also a weight of the enclosed articles. In these and other envisioned embodiments, various bar codes may be sequentially scanned during a particular user transaction and combined for a total weight 601. In still other envisioned embodiments, the corresponding service cost 604 may be similarly calculated. However, it should be understood that in yet additional embodiments, the package data 610 may include at least certain portions that are predetermined, based upon any of a variety of user parameters, such as, the non-limiting example of a cost 604 of at least $5.00 in shipping for any packages with a dimension 602 greater than ten inches.

As mentioned previously with regard to FIG. 5 and the general steps executed by the customer data module 400, the mobile device 200 may be configured according to various embodiments with a data acquisition device 201 so as to acquire some portion of the desired package data 610 directly from the package, or otherwise. In certain embodiments, the data acquisition device 201 may be integrally formed as at least a portion of the mobile device itself, while in other envisioned embodiments the two devices may be separately manufactured and configured, as in at least FIG. 1. In any of these "separate" embodiments, the two devices may be removably attached or merely positioned relatively adjacent or nearby, relative to one another, as a particular application may desire. In this manner, the two devices 200, 201 may efficiently and effectively communicate data therebetween, as has also been described previously herein.

Returning to further details surrounding the execution of steps 620 and 630 of FIG. 7 according to various embodiments, it should be understood that the data acquisition device 201, however physically configured, may comprise, at least in part, a bar code scanner. Such scanners, as commonly known and understood in the art, may be configured to read a variety of package-related data 610, as described previously herein, from a variety of scanned sources in a variety of formats. In any of these and other envisioned embodiments, the bar code scanner may be configured to retrieve at least a portion of the package data 610 directly from the package. As a non-limiting example, a user of the device may point the data acquisition device 201, more particularly its bar code scanner at a corresponding bar code of a package or retail article for purchase, thereby acquiring pertinent information for purchase and shipping of the same, as will be described in further detail below. However, it should be understood that in still other envisioned embodiments, the data acquisition device 201 may concurrently, or alternatively, comprise one or more of a two-dimensional imager, a magnetic card reader, or any of a variety of scanning and/or data reading devices, as may be commonly known and understood in the art as beneficial for such applications.

Figure 14:
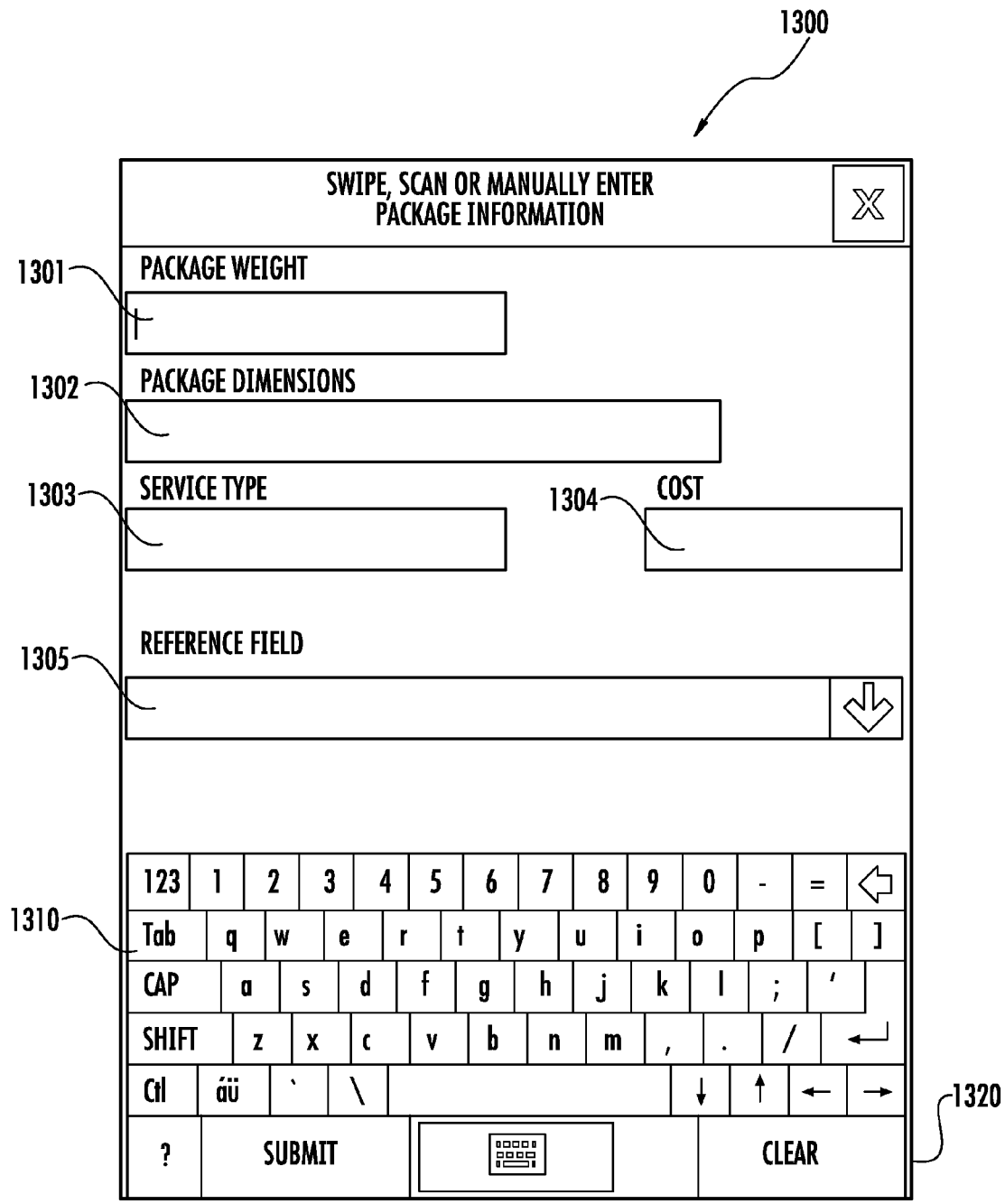
FIG. 14 is an exemplary package data entry screen of a handheld device of the mobile shipping system according to various embodiments.

The mobile device 200 may, in the various embodiments comprising a data acquisition device 201, further comprise an integrated package data entry screen 1300, as illustrated in at least FIG. 14. As may be seen from that figure, a user wishing to populate certain of the various displayed package data fields, namely a package weight field 1301, a package dimension field 1302, a service type field 1303, a service cost field 1304, and/or a reference field 1305 may manually enter any combination or portion of those fields via the mobile device 200 itself. For example, in at least the illustrated embodiment of FIG. 14, the mobile device 200 may incorporate a touchscreen display screen that includes an on screen input 1310 capable of receiving user-typed data into each of the respective fields. Still other envisioned embodiments of the mobile device 200 may, alternatively, use an external keyboard or otherwise configured input device, such as, for example, the remote terminal 100 for manual entry of particular fields of data. Of course, manual entry of any of the various customer data fields may be configured in any of a variety of manners, as generally may be commonly known and understood in the art.

Where manual entry of at least a portion of the package data 610 is performed according to various embodiments, such may be done in conjunction with acquisition of data via the data acquisition device 201 (e.g., the bar code scanner). However, in other envisioned embodiments, the acquisition of package data manually may be preferable, or even necessary, depending on various external factors. For example, a user of the device 200 may encounter a customer having an unreadable source of package data, whether a damaged or missing bar code upon a retail article or merely a previously unrecognizable data format. In such a scenario, the device 200 according to various embodiments may acquire the necessary package data 610 via alternative methods, whether via manual entry, as previously described, or otherwise. As such, it should be understood that not only do the various concurrent and/or alternative devices for facilitating data acquisition provide various alternative user options such also serve as backup or safety mechanisms should primarily relied upon options fail.

Once the package data module 600 determines that new package data 610 has been received in step 620 (and such is retrieved in step 630), whether via the data acquisition device 201 or otherwise, as previously described herein, the module proceeds to steps 660 and 680. In various embodiments, during step 660, the package data module 600 provides (e.g., transmits) at least a portion of the package data 610 to the print data module 800, as may be desirable for a particular application. According to various embodiments, during step 680, the package data module 600 may further prompt the user to provide payment data 710 to the payment data module 700, as will be described in further detail below. In certain embodiments, as described previously herein, user prompted acquisition of payment data 710 may occur concurrently with the steps performed by at least the data validation module 500. However, in various other envisioned embodiments, as may be desirable for particular applications, acquisition of the payment data 710 may be deferred until after at least the modules 500, 600 have performed their various configured steps, as described above.

Payment Data Module

Figure 8:
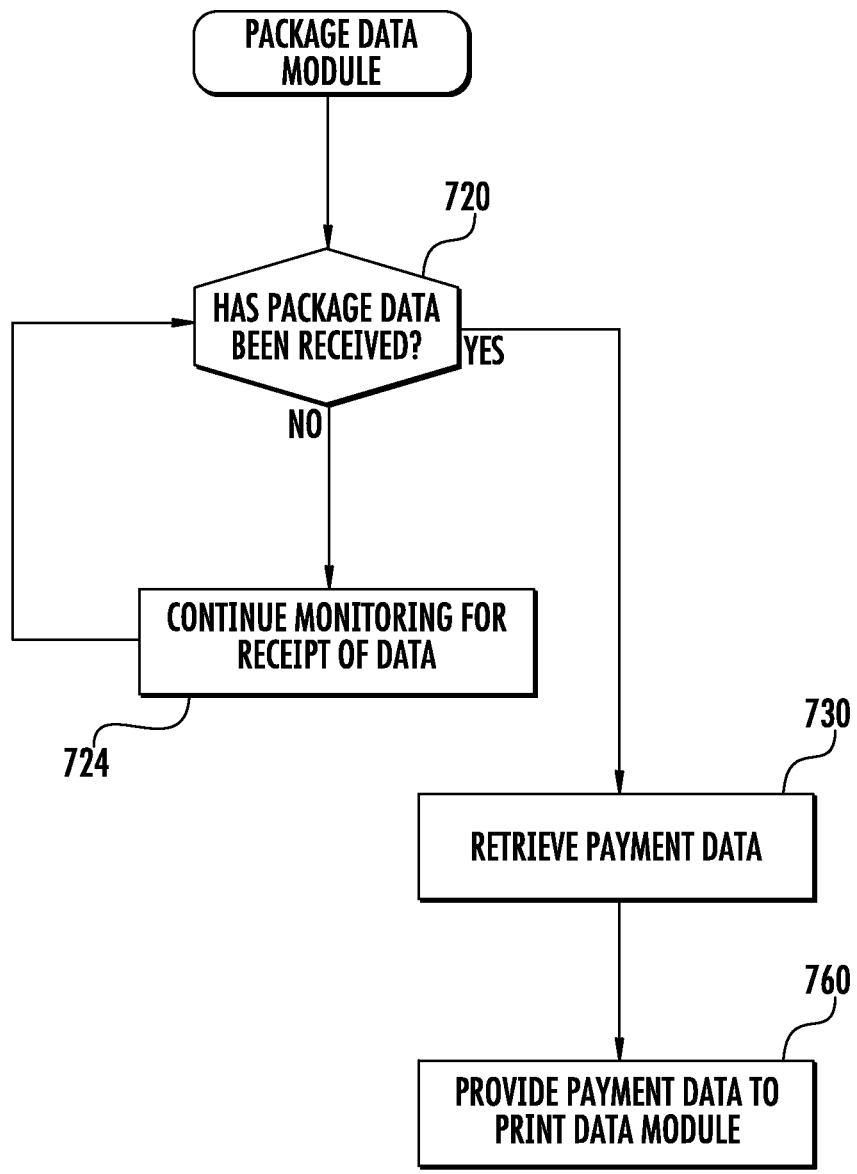
FIG. 8 is a flow diagram of steps executed by the payment data module shown in FIG. 2 according to various embodiments.

According to various embodiments, as shown in FIG. 3, payment data module 700 is configured to receive, store, and provide data associated with a customer's form of payment. FIG. 8 illustrates exemplary steps executed by the payment data module 700 according to various embodiments.

Beginning with step 720, the payment data module 700 of certain embodiments assesses whether data 710 (see FIG. 3) associated with a form of payment has been received by the module. In various envisioned embodiments, the payment data module 700 makes this assessment by scanning one or more data tables associated with the module and identifying payment data 710 within the data tables associated with a particular set of customer data 410 and/or package data 610, as previously described herein, that was, in particular, not present during a previous assessment likewise performed under step 720.

If, in various embodiments, execution of step 720 by the payment data module 700 determines that no new payment data 710 has been received, the payment data module proceeds, in step 724, to continue monitoring for receipt of such data. As previously described herein, such monitoring may, in certain embodiments be continuous in nature, while in other embodiments, such may be periodic, as may be desirable for a particular application. As a non-limiting example, a proprietor making use of such mobile devices 200 during the course of operating a business may configure the devices to automatically query for new or updated payment data 710, so as to avoid undue burdens upon associated systems if such queries were performed less frequently (e.g., hourly or otherwise). Further, such monitoring may, in these and still other embodiments be passive, although in other envisioned embodiments, the module 700 may be configured to actively query one or more databases for new data 710. In at least one embodiment (not shown), the payment data module 700 may query a remote terminal 100 and/or a central server 300 or the like, regarding payment data 710 instead of and/or in addition to querying the data acquisition device 201.

In various embodiments, the payment data 710 received in step 720 and subsequently retrieved in step 730 may include a variety of information commonly associated with certain methods and forms of payment, in particular bank and/or credit cards. As best understood from FIG. 3, the payment data 710 may include at least a payment type 701 (e.g., Mastercard, Amex, Debit, etc.), a card number 702, a security code 703 (e.g., a multi-digit number located on and/or associated with a presented form of payment, which in the case of at least a debit card may comprise a personal identification number (PIN)), an expiration date 704, and an authorized signature 705. However, it should be understood that various envisioned embodiments may include still other types and values of payment data, as may be desirable for a particular application or purpose, and such should be considered, nevertheless, within the scope of the present invention.

As mentioned previously with regard to FIG. 5 and the general steps executed by the customer data module 400, the mobile device 200 may be configured according to various embodiments with a data acquisition device 201 so as to acquire some portion of the desired payment data 710 directly from the tendered form of payment, or otherwise. In certain embodiments, the data acquisition device 201 may be integrally formed as at least a portion of the mobile device itself, while in other envisioned embodiments the two devices may be separately manufactured and configured, as in at least FIG. 1. In any of these "separate" embodiments, the two devices may be removably attached or merely positioned relatively adjacent or nearby, relative to one another, as a particular application may desire. In this manner, the two devices 200, 201 may efficiently and effectively communicate data there-between, as has also been described previously herein.

Returning to further details surrounding the execution of steps 720 and 730 of FIG. 8 according to various embodiments, it should be understood that the data acquisition device 201, however physically configured, may comprise, at least in part, a magnetic card reader. Such magnetic card readers, as commonly known and understood in the art, may be configured to read a variety of data from magnetic strips located on a variety of scanned sources, including the non-limiting examples of banking and credit cards, and the like. In any of these and other envisioned embodiments, the magnetic card reader may be configured to retrieve at least a portion of the payment data 710 directly from a scan of the magnetic strip located on, for example, the customer's debit card. In still other envisioned embodiments, the data acquisition device 201 may concurrently, or alternatively, comprise one or more of a two-dimensional imager and a bar code scanner, as such may prove beneficial for acquiring payment data from a variety of alternative payment data sources, which may or may not incorporate a magnetic strip, as previously described.

Figure 15:
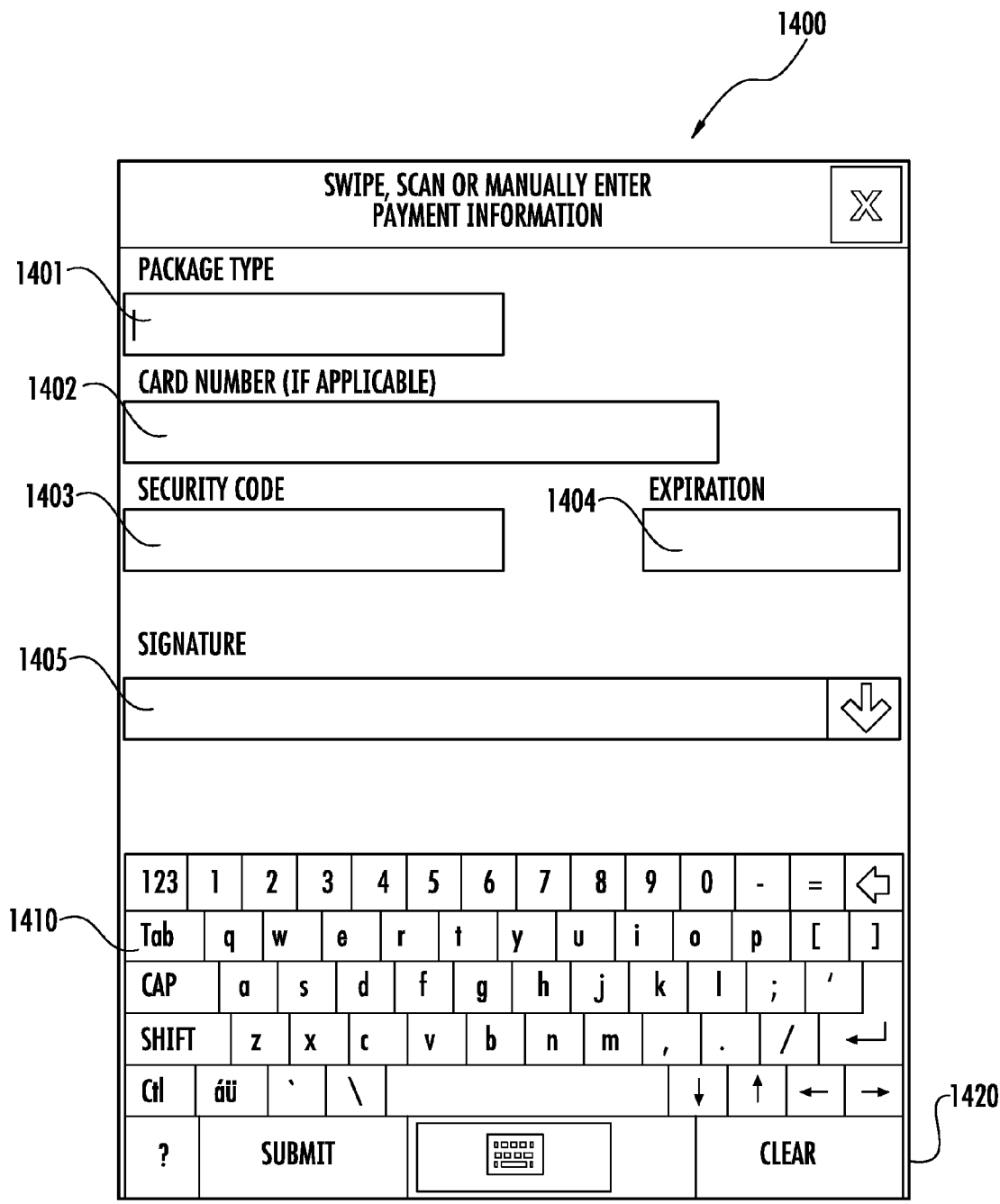
FIG. 15 is an exemplary payment data entry screen of a handheld device of the mobile shipping system according to various embodiments.

The mobile device 200 may, in the various embodiments comprising a data acquisition device 201, further comprise an integrated payment data entry screen 1400, as illustrated in at least FIG. 15. As may be seen from that figure, a user wishing to populate certain of the various displayed payment data fields, namely a payment type field 1401, a card number field 1402, a security code field 1403, an expiration field 1404, and/or a signature field 1405 may alternatively manually enter any combination or portion of those fields via the mobile device 200 itself. For example, in at least the illustrated embodiment of FIG. 15, the mobile device 200 may incorporate a touchscreen display screen that includes an on screen input 1410 capable of receiving user-typed data, including the non-limiting example of a user's or customer's authorizing signature 1405 for payment/charge of an amount, into each of the respective fields. Still other envisioned embodiments of the mobile device 200 may, alternatively, use an external keyboard or otherwise configured input device, such as, for example, the remote terminal 100 for manual entry of particular fields of data. Of course, manual entry of any of the various payment data fields may be configured in any of a variety of manners, as generally may be commonly known and understood in the art.

Where manual entry of at least a portion of the payment data 710 is performed according to various embodiments, such may be done in conjunction with acquisition of data via the data acquisition device 201 (e.g., the magnetic card reader and/or the bar code scanner). However, in other envisioned embodiments, the acquisition of customer data manually may be preferable, or even necessary, depending on various external factors. For example, a user of the device 200 may encounter a customer having an unreadable banking or credit card, whether with a damaged magnetic card strip or an unreadable security code. In such a scenario, the device 200 according to various embodiments may acquire the necessary payment data 710 via alternative methods, whether via manual entry, as previously described, or otherwise. As such, it should be understood that not only do the various concurrent and/or alternative devices for facilitating data acquisition provide various alternative user options such also serve as backup or safety mechanisms should primarily relied upon options fail.

Once the payment data module 700 determines that new payment data 710 has been received in step 720 (and such is retrieved in step 730), whether via the data acquisition device 201 or otherwise, as previously described herein, the module proceeds to step 760. In various embodiments, during step 760, the payment data module 700 provides (e.g., transmits) at least a portion of the payment data 710 to the print data module 800, as may be desirable for a particular application.

Print Data Module

According to various embodiments, as shown in FIG. 3, the print data module 800 is configured to generate one or more of a shipping label, a pick ticket, and/or a receipt, depending upon various inputs received from at least the customer data module 400, the package data module 600, and the payment data module 700.

Figure 9:
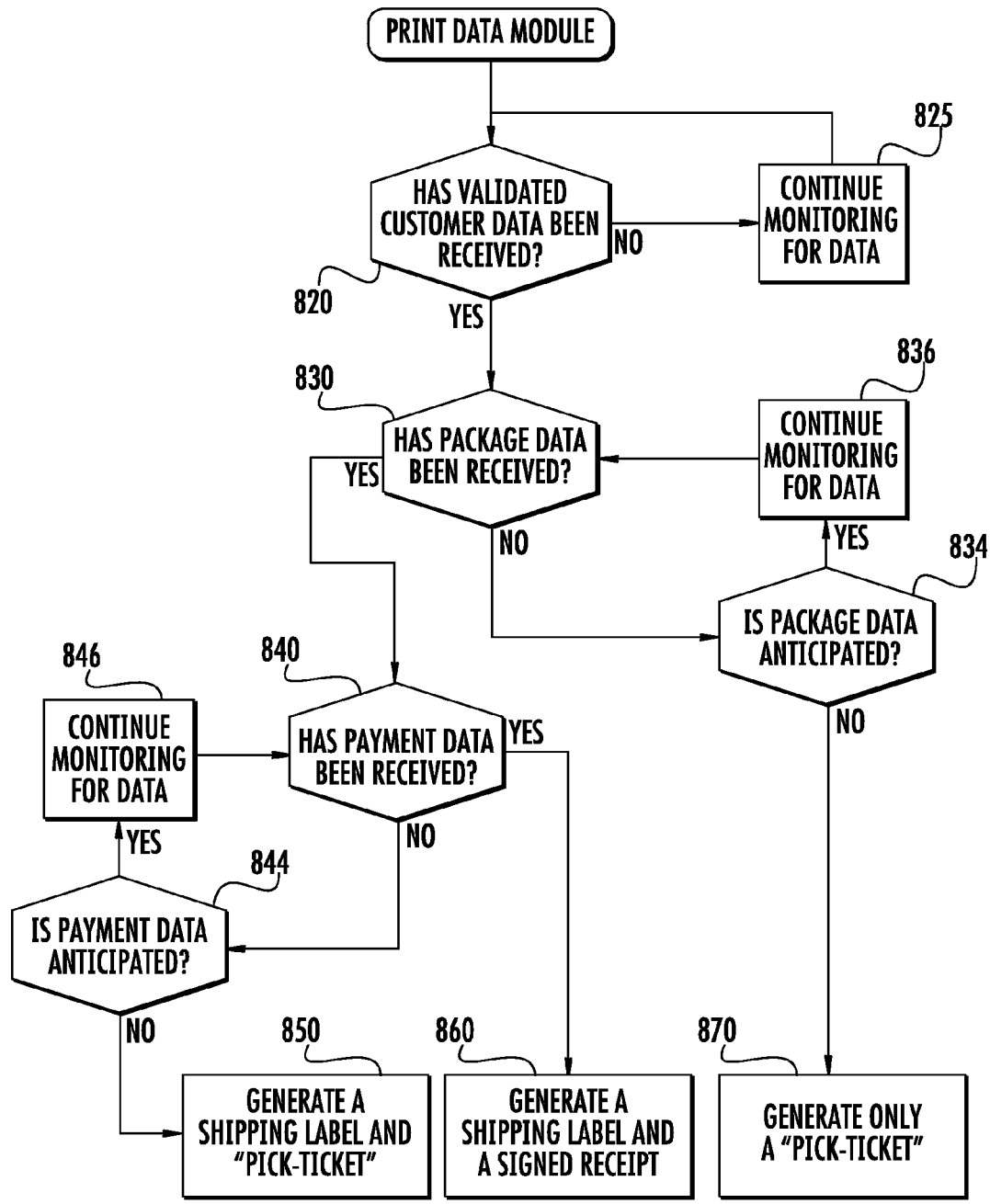
FIG. 9 is a flow diagram of steps executed by the print data module shown in FIG. 2 according to various embodiments.

FIG. 9 illustrates exemplary steps executed by the print data module 800 according to various embodiments. Beginning with step 820, according to various embodiments, the print data module 800 determines whether any new customer data 410 (and/or recipient data 405, as previously described herein) has been received by the module. If, in certain embodiments, execution of step 820 determines that no new customer data 410 has been received by or at the print data module 800, the module proceeds in step 825 to continue monitoring for receipt of such data. As previously described herein, such monitoring may, in certain embodiments be continuous in nature, while in other embodiments, such may be periodic, as may be desirable for a particular application. Further, such monitoring may, in still other embodiments be passive, although in other envisioned embodiments, the module 800 may be configured to actively query one or more databases for new customer data 410. In at least one embodiment (not shown), the print data module 800 may query a remote terminal 100 and/or a central server 300 or the like, regarding customer data 410 instead of and/or in addition to querying the data acquisition device 201.

Once, according to various embodiments, the print data module 800 identifies new customer data 410, the module proceeds to step 830. During step 830, the module further determines whether any new package data 610 has been received by the module. If, in certain embodiments, execution of step 830 determines that no new package data 610 has been received, the print data module 800 proceeds, in step 834 to query whether such data should be anticipated, as may be the case for a particular application. If such is anticipated, as indicated by a user input indication thereof or otherwise, as may be customary for a particular application, the module 800 proceeds to step 836.

In step 836 according to various embodiments, the print data module 800 will continue monitoring for receipt of new package data 610. As previously described herein, such monitoring may, in certain embodiments be continuous in nature, while in other embodiments, such may be periodic, as may be desirable for a particular application. Further, such monitoring may, in still other embodiments be passive, although in other envisioned embodiments, the module 800 may be configured to actively query one or more databases for new package data 610. In at least one embodiment (not shown), the print data module 800 may query a remote terminal 100 and/or a central server 300 or the like, regarding package data 610 instead of and/or in addition to querying the data acquisition device 201.

If, according to various embodiments, in step 834, the print data module 800 determines, whether via user input thereof or otherwise, that package data 610 is not anticipated, the module proceeds instead to step 870. During step 870, the print data module 800 according to these and still other envisioned embodiments, may be configured to generate a "pick-ticket" 1700, such as that illustrated as a non-limiting example in at least FIG. 18. As may be seen in at least that figure, the pick ticket 1700 may include a variety of pieces of information, including but not limited to a barcode 1706, a customer data field 1710 comprising at least a subset of customer data 410, and/or a recipient data field 1705 comprising at least a subset of recipient data 405, if such differs from the customer data. Various embodiments of the "pick-ticket" 1700 may further include general instructions (shown, but not numbered), directing a customer to provide this ticket, together with a package for purchase, at a payment counter or other location.

It should be understood that in at least these embodiments in which only a "pick ticket" 1700 is generated in step 870, the user or customer must subsequently provide both package data 610 and payment data 710, as may or may not be desirable for a particular application. Of course, while such does not fully incorporate the mobile device 200 throughout the duration of the purchase and shipment process, such may be necessary or desirable for a particular application. However, as will be described in further detail below, the mobile devices 200 associated with these and still other envisioned embodiments ultimately involving generation of a pick ticket 1700 via step 870 may be configured nonetheless as capable of receiving one or both of the package data 610 and the payment data 710, should such become necessary during a particular application.

In the various embodiments in which the print data module 800, during step 834, determined that package data is indeed anticipated (or received by the mobile device 200, but just not yet received by the module 800, however the case may be), the module 800 proceeds to step 830, in which some degree of package data 610 is ultimately received by the module. Once received, the print data module 800 proceeds to step 840, in which the module assesses whether any new payment data 710 has been received by the module. As with regard to the receipt of package data 610 described above, the module 800 proceeds, in step 844, to continue monitoring for receipt of such data. As previously described herein with respect to at least monitoring of customer data 410, such monitoring may according to various embodiments be conducted in a continuous, periodic, passive, and/or proactive fashion, as may be desirable for any of a variety of applications.

If, according to various embodiments, in step 844, the print data module 800 determines, whether via user input thereof or otherwise, that payment data 710 is not anticipated, the module proceeds instead to step 850. During step 850, the print data module 800 according to these and still other envisioned embodiments, may be configured to generate not only a "pick-ticket" 1700, as previously described herein and illustrated in at least FIG. 18, but also a shipping manifest or label 1600, as illustrated in at least FIG. 17. As may be seen in at least that figure, the shipping manifest or label 1600 may include a variety of pieces of information, including but not limited to at least one barcode 1606 and some portion and/or combination of the following data collected by the mobile device 200: a package weight 601, package dimensions 602, customer data 410, recipient data 405, service type 603, and/or a reference number 605 (e.g., a UPS tracking number).

It should be understood that the pick-ticket 1700 generated in step 850 may be substantially the same as that generated in step 870 in certain embodiments, while in other embodiments, such may be substantially differently configured, as may be desirable for a particular application. It should also be understood that the shipping manifest or label 1600, as described above may be alternatively configured and/or include any of a variety of pieces of data and information, as may be desirable for a particular application, with such being further envisioned as within the scope of the present invention. Further, in at least these embodiments in which a "pick ticket" 1700 and a shipping manifest or label 1600 is generated in step 850, the user or customer must subsequently provide at least some form of payment data 710 to fully complete the purchase and shipping process, as previously described herein.

Figure 19:
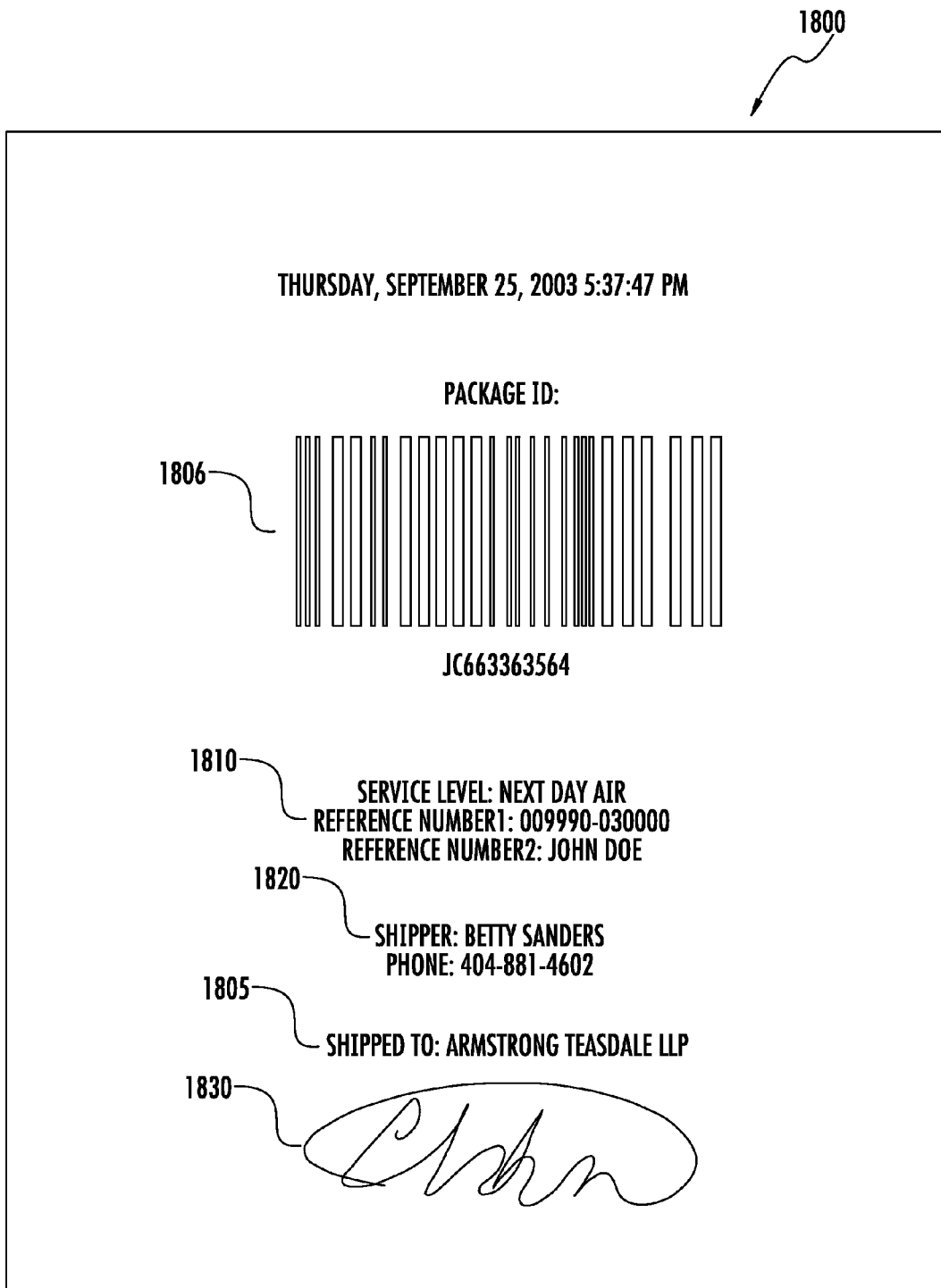
FIG. 19 is an exemplary receipt according to various embodiments.

Once, according to various embodiments, the print data module 800 identifies that new payment data 710 is anticipated and ultimately received by the module during step 840, the module proceeds to step 860. During step 860, the print data module 800 according to these and still other envisioned embodiments, may be configured to generate not only a shipping manifest or label 1600, as previously described herein and illustrated in at least FIG. 17, but also a signed receipt 1800, as illustrated in at least FIG. 19. As may be seen in at least that figure, the signed receipt 1800 may include a variety of pieces of information, including but not limited to at least one barcode 1806, some portion of package data 1810 (associated with data 610), customer data 1820 (associated with data 410), recipient data 1805 (associated with data 405), and an authorized signature 1830 (associated with signature data 705 acquired by the payment data module 700).

It should be understood that the shipping manifest or label 1600 generated in step 650 may be substantially the same as that generated in step 850 in certain embodiments, while in other embodiments, such may be substantially differently configured, as may be desirable for a particular application. It should also be understood that the signed receipt 1800, as described above may be alternatively configured and/or include any of a variety of pieces of data and information, as may be desirable for a particular application, with such being further envisioned as within the scope of the present invention. Further, in at least these embodiments in which a signed receipt 1800 and a shipping manifest or label 1800 (but, notably, no "pick ticket" 1700) is generated in step 860, the mobile device 200 facilitates seamless user or customer completion of the purchase and shipping process, as previously described herein.

Methods of Using various Embodiments of the Mobile Device

A method of using the mobile device 200 of FIG. 1 according to various embodiments will now be described in detail with particular reference to FIGS. 10-16, in which various exemplary user interface screens are illustrated.

The first step of using the mobile device 200 involves a user turning on the device, in response to which according to various embodiments, the user encounters a main screen display 1000, as illustrated in at least FIG. 10. As may be understood from the exemplary display 1000, the user may choose from any of a variety of options from this screen, including the non-limiting examples of entering data, transferring data (e.g., to a central server 300, or elsewhere), exiting from using the device, and/or seeking help on how to use the device. Such options may, in certain embodiments, be accessible via touchscreen buttons, as illustrated in at least FIG. 10, although in other envisioned embodiments, such may be alternatively accessible, as may be desirable for a particular application. In those embodiments having touchscreen buttons, at least a data entry button 1010, a transfer data button 1020, an exit button 1030, and a help button 1040 may be displayed on the main screen 1000.

As may be understood from viewing FIGS. 10 and 11 in conjunction with one another, selection of the data entry button 1010 may, according to various embodiments, replace the main screen 1000 with a customer data entry screen 1100, which may contain a plurality of fields for entry of customer data 410 and/or recipient data 405, as previously described herein. Notably, a user, once accessing the customer data entry screen 1100, may populate the same either by scanning data from, for example, a customer's driver's license, or by manually entering all or some portion of the same, as may be desirable for a particular application. Exemplary populated fields, upon data entry by the user, may be seen in FIG. 12.

Once a user has acquired various pieces of customer data in accordance with the method, the user may hit a "submit" button, as illustrated (but not numbered) in at least FIG. 11. Such action, according to various embodiments, will transfer the user to a data validation screen 1200, as illustrated in at least FIG. 13. On this screen, the user may select from one or more options of validated data results 1202 (associated with results 505, as previously described herein). Alternatively, as may be desirable for a particular application, the user may select to use the current (e.g., originally input) data, illustrated in exemplary form as a portion of address data 402, as previously described herein. Once selected, the data validation screen 1200 displays in field 1203 details of the data selected by the user, which the user may, in accordance with the method, accept by hitting the "submit" button.

In accordance with various embodiments of the exemplary method described herein, submitting the validated address results brings a user to a new package data screen 1300. On the package data screen 1300, the user may enter a variety of pieces of information regarding a retail item or package associated therewith for purchase, as has been previously described herein. The user may, for example, enter such information into fields 1301-1305, in part or in whole, via a bar code scan of the item or package. Alternatively, the user may enter any portion of the requested data into the respective fields via a touchscreen keyboard 1310, as commonly known and understood in the art.

It should be understood that in the exemplary embodiment, once a user has submitted package data, the user may "submit" the same to the mobile device 200, in which case the device generally displays a payment data screen 1400, as illustrated in at least FIG. 15. However, in alternative methods, the user, when faced with package data screen 1300 may opt to not enter any or at least a portion of the package data via the mobile device 200 at all, in which embodiments, the user may be taken directly to a print data screen 1500 and given the option to checkout and print 1510. In such instances, the user could receive a "pick-ticket," which the user could take to a traditional checkout counter or facility.

If, as described above, the user has submitted the appropriate package data, the user may then submit various items of payment data on the payment data screen 1400, as such items have been previously described herein. If, as described above, the user wishes to, according to various aspects of this exemplary method, wishes to not enter payment data, the user may not do so, in which case, upon submittal, the user will be taken directly to the print data screen 1500. Of course, if the user likewise submits payment data, the user will be similar directed to the print data screen 1500, but just receive alternative options, as described below.

According to various embodiments, the print data screen 1500 permits the user to checkout and print 1510 various items, dependent upon what information the user has entered in the previous screens of FIGS. 11-15. For example, if the user only entered customer data, but no package or payment data, the user may, upon selecting to checkout 1510 (e.g., a touchscreen button, or otherwise activated input, as previously described), may cause the system 5 to generate a "pick ticket" 1700, as illustrated in at least FIG. 18. Alternatively, where the user has entered not only customer data, but also package data, the print data screen 1500 may permit checkout and printing of a shipping manifest of label 1600 and the "pick ticket" 1700. Only in those instances in which the user has, according to various embodiments, entered not only customer data and package data, but also payment data, will the checkout 1510 permit the user to generate the shipping manifest of label 1600 and a signed receipt 1800.

Figure 16:
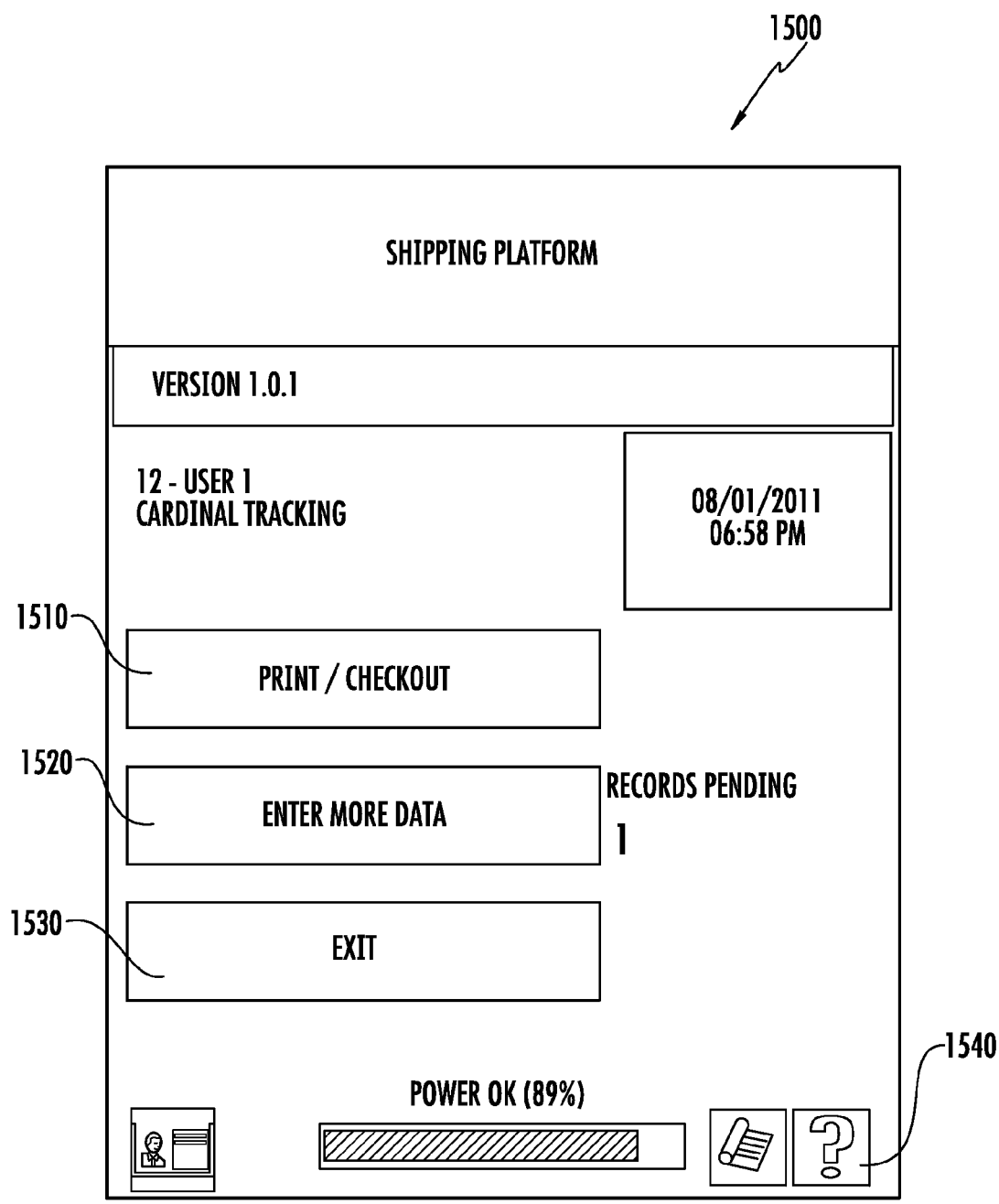
FIG. 16 is an exemplary print data entry screen of a handheld device of the mobile shipping system according to various embodiments.

As may be further understood from FIG. 16, a user of the device according to various embodiments may wish to go back and subsequently enter either package or payment data, or even further customer data, upon reaching the print data screen 1500. In such instances, the screen 1500 may further comprise according to certain embodiments a data entry button 1520, through which the user may return to any of the previously described screens, as desired. Such a button 1520, may however be configured via alternative embodiments to permit a user to return to prior screens only after fully completing a particular transaction, for example, for the purpose of beginning a new transaction, as is often necessary in high-volume retail environments.

Conclusion

It will be appreciated by one of ordinary skill in the art that one or more of the components of the computer systems described herein may be located geographically remotely from other components. Furthermore, one or more of the components may be combined, and additional components performing the functions described herein may be included in the first carrier computer system.

Figures in the present application are schematic diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s).

These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A portable handheld device operable within a retail sales location for facilitating fully mobile completion, at the portable handheld device, of a purchase and shipping transaction for a product by a customer, the portable handheld device comprising:
   one or more memory storage areas;
   at least one integrated data entry screen;
   one or more bar code scanners; and
   one or more computer processors that are configured to receive and retrieve data stored in the one or more memory storage areas, wherein the one or more computer processors are configured to:
   (A) receive, via said one or more bar code scanners, customer data associated with a customer at the retail sales location, said customer data being contained at least in part upon the customer's drivers' license;
   (B) wirelessly transmit at least a portion of the customer data to a remote validation tool;
   (C) receive validation data identifying validated portions of the customer data, said identified validated portions being displayed on said integrated data entry screen as one or more options of validated customer data results;
   (D) obtain, at said portable handheld device, scanned package data associated with a package for shipment and obtained by said one or more bar code scanners scanning one or more bar codes located on the package and one or more products to be shipped within said package, wherein the scanned package data associated with the package comprises package dimensions contained within the bar code located on the package and a package weight determined based on data stored within the bar code located on the package and data stored within a bar code located on each product to be shipped within the package;
   (E) determine, based upon the scanned package data and a selection by the customer of at least one of the one or more options of validated customer data results displayed via said integrated data entry screen, a service cost for shipment of the package from the retail location;
   (F) apply against said service cost payment data a type of payment presented by the customer and received via each of said devices; and
   (G) based upon said selected one of the one or more options of validated customer data results, the scanned package data, and the payment data applied against said service cost:
   1. generate and print at said at least one portable handheld device a shipping manifest configured for immediate securing to the package during shipment and containing said selected one of the one or more options of validated customer data results;
   2. generate and print at said at least one portable handheld device a receipt indicating that shipping services for the package have been purchased; and
   3. upon generation and printing of said shipping manifest and said receipt at said at least one portable handheld device, marking said purchase of said product by said customer as complete and based upon said marking, permitting navigation to a main screen configured for beginning a separate purchase and shipping transaction by said customer or a separate customer.

2. The portable handheld device of claim 1, further comprising:
   one or more magnetic card readers; and
   the customer drivers' license comprises a magnetic strip portion containing at least a portion of the received customer data, the magnetic strip portion being configured to be read by the one or more magnetic card readers.

3. The portable handheld device of claim 1, wherein the customer data comprises at least a customer name and a customer address.

4. The portable handheld device of claim 3, wherein the validated data corresponds to at least the customer address.

5. The portable handheld device of claim 3, wherein the customer data further comprises at least a customer email and a customer phone.

6. The portable handheld device of claim 5, wherein:
   the mobile purchase and shipping system further comprises a touchscreen display; and
   the customer email and the customer phone are received via the touchscreen display.

7. The portable handheld device of claim 1, wherein the type of payment is a customer payment card.

8. The portable handheld device of claim 7, further comprising:
   one or more magnetic card readers; and
   the customer payment card comprises a magnetic strip portion containing at least the received payment data, the magnetic strip portion being configured to be read by the one or more magnetic card readers.

9. The portable handheld device of claim 7, wherein the customer payment card is a credit or debit card.

10. The portable handheld device of claim 7, wherein the payment data comprises at least a card number and a customer signature.

11. The portable handheld device of claim 10, further comprising:
    a touchscreen display; and wherein
    the card number is received via the one or more magnetic card readers; and
    the customer signature is received via the touchscreen display.

12. The portable handheld device of claim 1, wherein the scanned package data comprises at least one identifier that is selected from a group consisting of: a package weight, package dimensions, a service type, a service cost, and a reference code or number.

13. The portable handheld device of claim 1, further comprising:
   a two-dimensional imager; and wherein
   at least a portion of the customer data has been obtained by:
      (A) using the imager to acquire a scanned image of the customer data; and
      (B) identifying the received customer data from the information in the scanned image.

14. The portable handheld device of claim 1, wherein the validated data is received over a network, as transmitted from a remote data validation tool.

15. The portable handheld device of claim 1, wherein:
   the one or more computer processors are in communication with a mobile printer; and
   the mobile printer is configured to generate a package shipping label associated with the shipping manifest.

16. The portable handheld device of claim 15, wherein the mobile printer is further configured to generate a signed receipt associated with the shipping manifest.

17. A non-transitory computer program product comprising at least one computer-readable storage medium having computer-readable program code portions embodied therein, the at least one computer-readable storage medium being located on at least one portable handheld device operable within a retail sales location, the computer-readable program code portions comprising one or more executable portions configured to facilitate fully mobile completion, at the portable handheld device, of a purchase and shipping transaction for a product by a customer by:
   receiving at said at least one portable handheld device and via one or more bar code scanners customer data, said customer data date being contained at least in part upon a customer's drivers' license;
   wirelessly transmitting at least a portion of the customer data to a remote validation tool;
   receiving validation data identifying validated portions of the customer data, said identified validated portions being displayed on an integrated data entry screen as one or more options of validated customer data results;
   an obtaining, at said at least one portable handheld device, scanned package data associated with a package for shipment and obtained by said one or more bar code scanners scanning one or more bar codes located on the package and one or more products to be shipped within said package, wherein the scanned package data associated with the package comprises package dimensions contained within the bar code located on the package and a package weight determined based on data stored within the bar code located on the package and data stored within a bar code located on each product to be shipped within the package;
   determining, based upon the scanned package data and a selection by the customer of at least one of the one or more options of validated customer data results displayed via said integrated data entry screen, a service cost for shipment of the package from the retail location;
   applying against said calculated service cost payment data a type of payment presented by the customer via said at least one portable handheld device; and
   based upon said selected one of the one or more options of validated customer data results, the scanned package data, and the payment data applied against said service cost:
      generate and print at said at least one portable handheld device a shipping label manifest configured for immediate securing to the package during shipment and containing said selected one of the one or more options of validated customer data results;
      generate and print at said at least one portable handheld device a receipt indicating that shipping services for the package have been purchased; and
      upon generation and printing of said shipping manifest and said receipt at said at least one portable handheld device, marking said purchase of said product by said customer as complete and based upon said marking, permitting navigation to a main screen configured for beginning a separate purchase and shipping transaction by said customer or a separate customer.

* * * * *